(12) United States Patent
Toba et al.

(10) Patent No.: US 12,321,521 B2
(45) Date of Patent: Jun. 3, 2025

(54) SIGNAL PROCESSING APPARATUS, SIGNAL PROCESSING METHOD, AND SIGNAL PROCESSING SYSTEM

(71) Applicant: SONY GROUP CORPORATION, Tokyo (JP)

(72) Inventors: Kazuaki Toba, Tokyo (JP); Gen Ichimura, Tokyo (JP); Osamu Ito, Tokyo (JP); Yusuke Nakagawa, Tokyo (JP); Ryo Yokoyama, Tokyo (JP); Ikuo Yamano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/251,538

(22) PCT Filed: Oct. 8, 2021

(86) PCT No.: PCT/JP2021/037381
§ 371 (c)(1),
(2) Date: May 2, 2023

(87) PCT Pub. No.: WO2022/102307
PCT Pub. Date: May 19, 2022

(65) Prior Publication Data
US 2024/0012482 A1    Jan. 11, 2024

(30) Foreign Application Priority Data
Nov. 10, 2020    (JP) ................. 2020-187387

(51) Int. Cl.
*G06F 3/01*    (2006.01)
*G06V 40/10*   (2022.01)
*G06V 40/20*   (2022.01)

(52) U.S. Cl.
CPC .............. *G06F 3/016* (2013.01); *G06F 3/011* (2013.01); *G06V 40/103* (2022.01); *G06V 40/23* (2022.01)

(58) Field of Classification Search
CPC .... G06F 3/016; G06F 3/011; G06F 2203/013; G06V 40/103; G06V 40/23;
(Continued)

(56) References Cited

U.S. PATENT DOCUMENTS

| 2014/0070957 A1* | 3/2014 | Longinotti-Buitoni ............. A61B 5/02055 340/870.01 |
| 2018/0181201 A1* | 6/2018 | Grant ................ G06F 3/012 |
| 2023/0117814 A1* | 4/2023 | Moore ............... G09B 23/285 |

FOREIGN PATENT DOCUMENTS

| JP | 2015-215891 A | 12/2015 |
| JP | 2018-109974 A | 7/2018 |

(Continued)

OTHER PUBLICATIONS

International Search Report and Written Opinion of PCT Application No. PCT/JP2021/037381, issued on Dec. 14, 2021, 09 pages of ISRWO.

*Primary Examiner* — Amit Chatly
(74) *Attorney, Agent, or Firm* — CHIP LAW GROUP

(57) ABSTRACT

A signal processing apparatus according to the present technology includes an information acquisition unit that acquires state information indicating a state of a user including a posture of the user, a tactile signal acquisition unit that acquires a reference tactile signal for performing tactile presentation to the user in a reference state, and an adjustment processing unit that generates an adjusted tactile signal by adjusting the reference tactile signal on the basis of the state information.

15 Claims, 21 Drawing Sheets

(58) Field of Classification Search
CPC ......... H04N 21/44218; H04N 21/4542; H04N 21/4668; H04N 21/4223; A63F 13/285
See application file for complete search history.

(56) References Cited

FOREIGN PATENT DOCUMENTS

| | | |
|---|---|---|
| WO | 2020/026443 A1 | 2/2020 |
| WO | 2020/054415 A1 | 3/2020 |

* cited by examiner

FRONT SIDE

BACK SIDE

PACKET DATA STRUCTURE

| HEADER | PAYLOAD | FOOTER |
|---|---|---|

SIGNAL PROCESSING APPARATUS, SIGNAL PROCESSING METHOD, AND SIGNAL PROCESSING SYSTEM

CROSS REFERENCE TO RELATED APPLICATIONS

This application is a U.S. National Phase of International Patent Application No. PCT/JP2021/037381 filed on Oct. 8, 2021, which claims priority benefit of Japanese Patent Application No. JP 2020-187387 filed in the Japan Patent Office on Nov. 10, 2020. Each of the above-referenced applications is hereby incorporated herein by reference in its entirety.

TECHNICAL FIELD

The present technology relates to a signal processing apparatus, a signal processing method, and a signal processing system, and particularly to a technology for a signal processing apparatus which generates tactile signals for tactile presentation.

BACKGROUND ART

There has been proposed a technology for providing such a user experience that allows a user to experience entertainment that is more realistic, by giving the user stimuli other than auditory and visual stimuli along with videos and sounds.

It is preferable to provide a similar tactile stimulus for each of users viewing and listening to the same content.

However, the way of feeling the tactile stimulus differs between the users depending on various factors.

Concerning such a problem, PTL 1 described below discloses a technology for checking whether a tactile presentation device is operating in a desired manner, and then adjusting, if necessary, tactile signals for providing a tactile stimulus for a user.

CITATION LIST

Patent Literature

[PTL 1]
JP 2015-215891A

SUMMARY

Technical Problem

Meanwhile, a creator of tactile signals generates tactile signals to provide an appropriate tactile stimulus in consideration of the details of content or the like. It is preferable to adjust the tactile signals in such a manner as to appropriately reflect the intention of the creator.

According to the method described in PTL 1, a user (who experiences a tactile stimulus) is given a tactile stimulus, checks the tactile stimulus by himself or herself, and then adjusts tactile signals. In this case, however, the adjustment does not necessarily reflect the intention of the creator.

The present technology has been developed in consideration of such circumstances. An object of the present technology is to adjust tactile signals such that an appropriate tactile stimulus reflecting the intention of a creator is provided for a user.

Solution to Problem

A signal processing apparatus according to the present technology includes an information acquisition unit that acquires state information indicating a state of a user including a posture of the user, a tactile signal acquisition unit that acquires a reference tactile signal for performing tactile presentation to the user in a reference state, and an adjustment processing unit that generates an adjusted tactile signal by adjusting the reference tactile signal on the basis of the state information.

When the posture of the user changes, a tactile stimulus that the user feels also changes. According to the present configuration, the adjusted tactile signal corresponding to the state of the user is generated by adjusting the reference tactile signal on the basis of the state information indicating the state of the user including the posture of the user.

The signal processing apparatus described above may further include a determination processing unit that determines whether or not execution of the adjustment is enabled.

Depending on the posture or the like of the user, a tactile stimulus appropriate for the user may change or may not change. According to the present configuration, it is possible to switch between a case of executing the adjustment on the basis of the state information regarding the user and a case of not executing the adjustment, as necessary.

The determination processing unit of the signal processing apparatus described above may decide a result of the determination of whether or not the execution of the adjustment is enabled, on the basis of an operation performed by the user.

It is conceivable that whether or not to adjust the tactile signal may automatically be decided according to the type or the like of the tactile signal or otherwise be decided by the user.

The signal processing apparatus described above may further include an identification information setting unit that sets, in the reference tactile signal, identification information indicating whether or not the reference tactile signal is to be adjusted.

In this configuration, the adjustment processing unit can decide whether or not to make the adjustment, by checking the identification information for each reference tactile signal.

The determination processing unit of the signal processing apparatus described above may determine whether or not the adjustment is necessary, on the basis of a difference between the posture of the user and the reference state.

This make it possible to appropriately determine whether or not the reference tactile signal needs to be adjusted, in consideration of the posture of the user.

The determination processing unit of the signal processing apparatus described above may determine whether or not the adjustment is disabled, on the basis of the state information and the reference state.

For example, in a case where the state (e.g., posture) of the user excessively deviates from the reference state, the user may not possibly feel an appropriate tactile stimulus even when the reference tactile signal is adjusted.

The signal processing apparatus described above may further include a communication control unit that performs transmission control to transmit a tactile signal to a tactile signal reproducer configured to reproduce the tactile signal. The communication control unit may perform the transmission control such that the tactile signal is not reproduced by the tactile signal reproducer in a case where the adjustment is determined to be disabled.

A tactile stimulus can be prevented from being given to the user, by preventing the tactile signal from being reproduced in a case where the adjustment is determined to be disabled.

The communication control unit of the signal processing apparatus described above may not transmit the tactile signal in the case where the adjustment is determined to be disabled.

This makes it possible to reduce a processing load upon the transmission process for transmitting the tactile signal.

The communication control unit of the signal processing apparatus described above may transmit the tactile signal with control information added to the tactile signal so as to prevent the tactile signal from being reproduced in the case where the adjustment is determined to be disabled.

With this, the signal processing apparatus for adjusting the tactile signal can perform the transmission process to transmit the tactile signal in a uniform manner regardless of necessity or unnecessity of the adjustment. For example, in a case of transmission of the tactile signals to multiple tactile signal reproducers, there is no need to perform control in such a manner as to avoid transmission of the tactile signal to a specific tactile signal worn by a user whose posture is considerably different from the reference state.

The signal processing apparatus described above may further include the communication control unit that performs transmission control to transmit a tactile signal to a tactile signal reproducer configured to reproduce the tactile signal. The information acquisition unit may acquire visual recognition information indicating whether or not the user is visually recognizing a video that is to be visually recognized by the user, and the communication control unit may perform the transmission control such that the tactile signal is not reproduced by the tactile signal reproducer in a case where information indicating that the user is not visually recognizing the video is acquired as the visual recognition information.

It is assumed that the user feels tactile stimuli in various situations. As such situations, there are a case where the user is concentrating on content and a case where the user is not concentrating on the content. For example, supposing that the user enjoys watching a video with a tactile stimulus, as a method for determining whether or not the user is concentrating on the content, it is possible to determine whether or not the user is properly viewing and listening to the video.

The signal processing apparatus described above may further include the communication control unit that performs transmission control to transmit a tactile signal to a tactile signal reproducer configured to reproduce the tactile signal. The communication control unit may perform the transmission control to give a notification that the adjustment has been made, in a case where the adjusted tactile signal is transmitted.

In such a manner, the user can recognize that the reference tactile signal has been adjusted.

The adjustment processing unit of the signal processing apparatus described above may make adjustment to change strength of the tactile presentation, when adjusting the reference tactile signal.

This makes it possible to perform the tactile presentation with appropriate strength according to the state of the user.

The adjustment processing unit of the signal processing apparatus described above may make the adjustment according to a tactile signal reproducer worn by the user.

This makes it possible to transmit the tactile signal which is appropriately adjusted according to not only the difference in the state of the user but also the difference in the tactile signal reproducer worn by the user.

The adjustment processing unit of the signal processing apparatus described above may adjust the strength and a timing of the tactile presentation according to the state information and a position of a tactile presentation unit included in the tactile signal reproducer.

In such a manner, even when users wear the tactile signal reproducers which include the vibration units at different positions, an appropriate tactile signal is generated for each of the users. In addition, frequency characteristics of the tactile presentation signal may be adjusted according to reproduction frequency characteristics of the tactile presentation unit included in the tactile signal reproducer.

The information acquisition unit of the signal processing apparatus described above may acquire distance information indicating a distance between the user and a display device on which a video to be visually recognized by the user is displayed. The adjustment processing unit may make the adjustment to change the strength of the tactile presentation according to the acquired distance information.

In a case where the user enjoys a tactile stimulus while viewing a video, an optimum tactile stimulus is highly likely to change when the video is viewed in a different manner.

The information acquisition unit of the signal processing apparatus described above may acquire the state information every time the posture of the user changes.

When the posture of the user changes, an optimum tactile stimulus also changes.

A signal processing method performed by a signal processing apparatus according to the present technology includes a process of acquiring state information indicating a state of a user including a posture of the user, a process of acquiring a reference tactile signal for performing tactile presentation to the user in a reference state, and a process of generating an adjusted tactile signal by adjusting the reference tactile signal on the basis of the state information.

A signal processing system according to the present technology includes a signal processing apparatus and a tactile signal reproducer. The signal processing apparatus includes an information acquisition unit that acquires state information indicating a state of a user including a posture of the user, a tactile signal acquisition unit that acquires a reference tactile signal for performing tactile presentation to the user in a reference state, and an adjustment processing unit that generates an adjusted tactile signal by adjusting the reference tactile signal on the basis of the state information. The tactile signal reproducer reproduces the adjusted tactile signal.

DESCRIPTION OF EMBODIMENT

An embodiment will hereinafter be described in the following order.
<1. System configuration>
<2. Adjustment process>
  <2-1. First example of adjustment process>
  <2-2. Second example of adjustment process>
  <2-3. Third example of adjustment process>
  <2-4. Fourth example of adjustment process>
<3. Notification process>
<4. Configuration of computer apparatus>
<5. Processing example>
<6. Modifications>
<7. Summary>
<8. Present technology>

<1. System Configuration>

In the present embodiment, a signal processing system which provides a tactile stimulus for a user on the basis of tactile signals generated by a creator will be described.

Note that, in the following description, an example where a tactile stimulus is provided for a user in order to further improve a sense of realism given by movie content will be described. However, modes for carrying out the present technology are not limited to this example. For example, a new experience may be provided for a user by combining acoustic data such as music and voices with a tactile stimulus. Moreover, a more enjoyable game may be offered by providing a tactile stimulus in conjunction with video data and acoustic data included in game content. Needless to say, a tactile stimulus may be combined with information other than video data and acoustic data and provided for a user.

Figure 1:
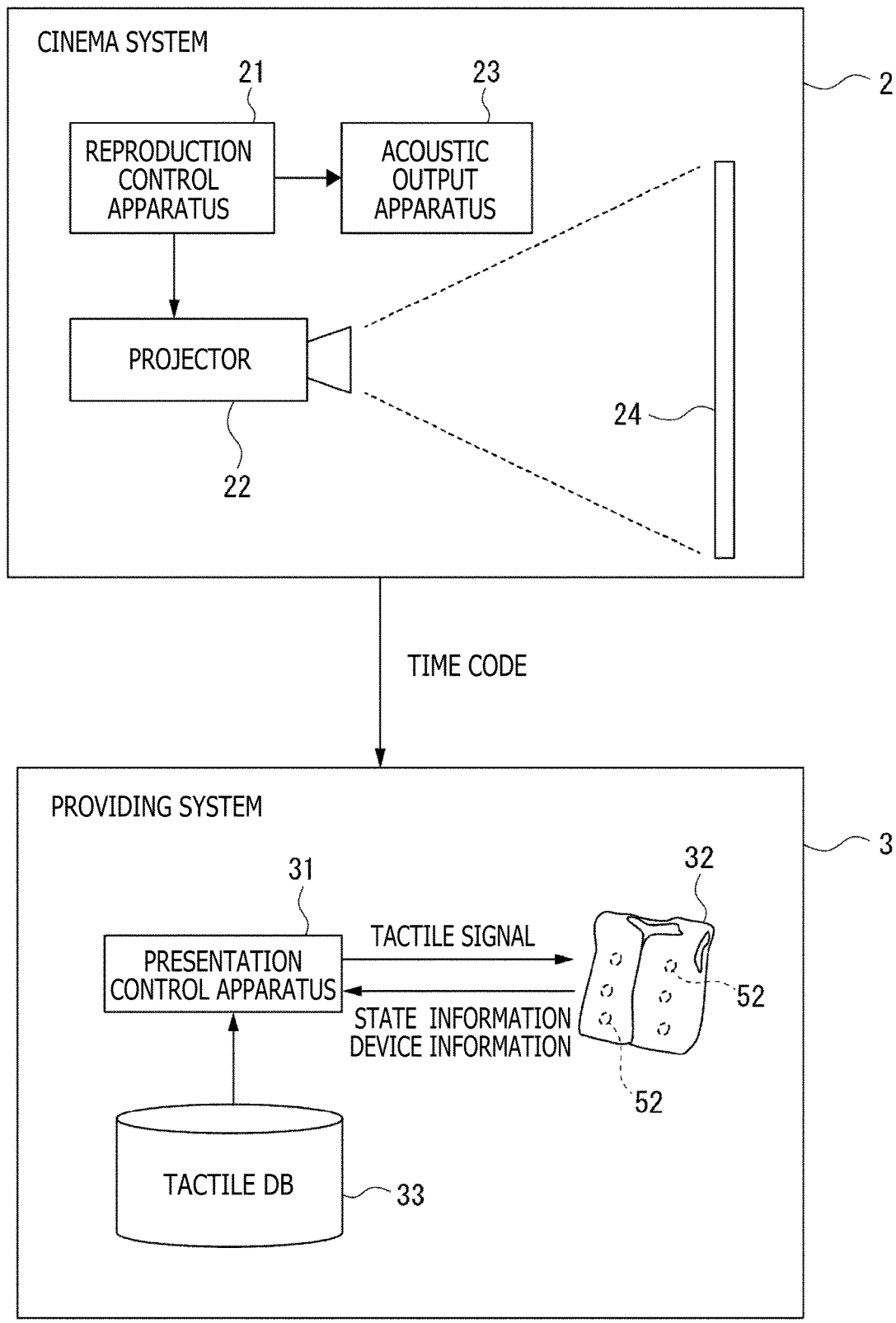
FIG. 1 is a diagram depicting a configuration example of an entertainment system according to an embodiment.

An entertainment system 1 which provides movie content for a user will be described with reference to FIG. 1.

The entertainment system 1 includes a cinema system 2 which allows the user to view and listen to videos and sounds of the movie content, and a providing system 3 functioning as a signal processing system which performs signal processing to provide a tactile stimulus for the user according to tactile signals.

The cinema system 2 includes a reproduction control apparatus 21, a projector 22, an acoustic output apparatus 23, and a screen 24.

The reproduction control apparatus 21 outputs video data of the movie content to the projector 22, and also outputs acoustic data of the movie content to the acoustic output apparatus 23. Moreover, the reproduction control apparatus 21 transmits a time code indicating a reproduction position at which video content is reproduced, to the providing system 3, which will be described later, to synchronize the cinema system 2 with the providing system 3.

The projector 22 performs a projection process for the video data of the movie content on the basis of an instruction from the reproduction control apparatus 21 to display videos on the screen 24.

The acoustic output apparatus 23 outputs acoustic sounds synchronized with the video content, on the basis of an instruction from the reproduction control apparatus 21.

The providing system 3 includes a presentation control apparatus 31, a tactile signal reproducer 32 in the shape of a vest, and a tactile DB (Database) 33. The tactile signal reproducer 32 is a tactile presentation device, and the number of tactile signal reproducers 32 may be one or more. Moreover, a single user may wear (or use) a tactile signal reproducer 32, or may wear/use multiple tactile signal reproducers 32. For example, the single user may wear the tactile signal reproducer 32 in the shape of a vest and the tactile signal reproducers 32 on the feet or the arms of the user.

The presentation control apparatus 31 receives a time code from the cinema system 2, and controls the tactile signal reproducer 32 on the basis of the time code. Specifically, the presentation control apparatus 31 transmits a tactile signal to the tactile signal reproducer 32 at an appropriate timing corresponding to the time code. Note that, while specifically described below, the tactile signals to be transmitted include a "reference tactile signal" which is an unadjusted signal and an "adjusted tactile signal" obtained by adjusting a reference tactile signal.

Note that the tactile signal reproducer 32 may be seat-shaped (chair-shaped) equipment that is used without being worn by the user, instead of equipment that the user can wear.

The presentation control apparatus 31 manages the tactile DB 33 where time codes, tactile signals to be reproduced, and various types of control information are associated with one another and stored. The presentation control apparatus 31 acquires a reference tactile signal to be presented from the tactile DB 33 according to a received time code, and transmits the acquired reference tactile signal without change or an adjusted tactile signal that has been adjusted, to the tactile signal reproducer 32.

Figure 2:
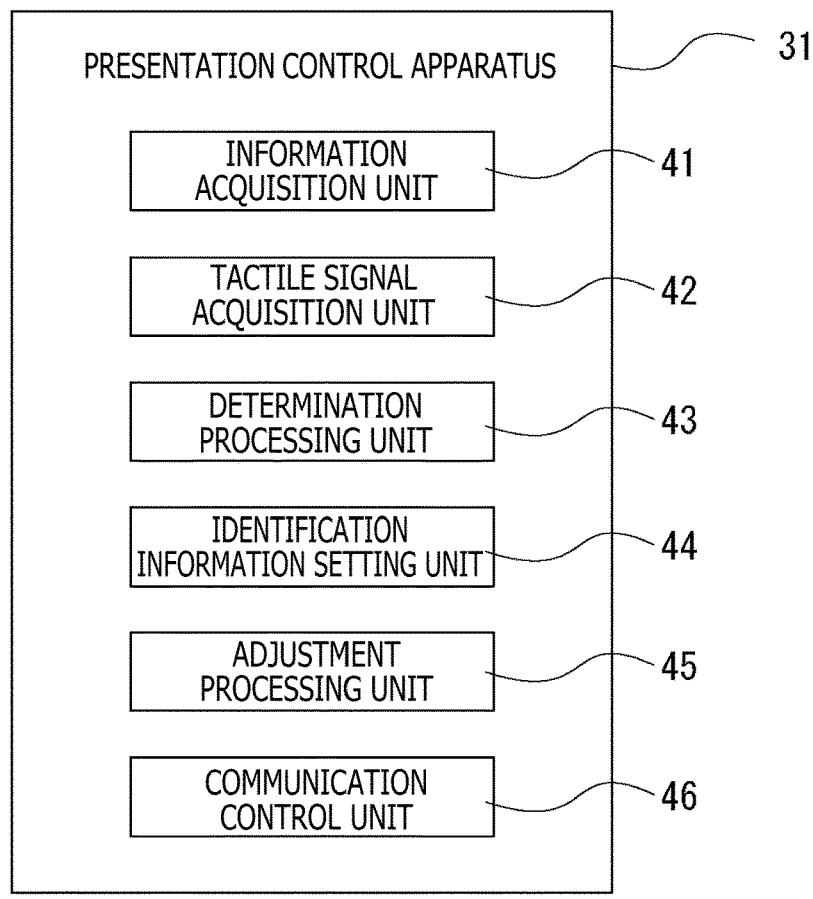
FIG. 2 is a block diagram depicting a functional configuration of a presentation control apparatus.

In order to implement these processes, the presentation control apparatus 31 includes an information acquisition unit 41, a tactile signal acquisition unit 42, a determination processing unit 43, an identification information setting unit 44, an adjustment processing unit 45, and a communication control unit 46 (see FIG. 2).

In addition, the tactile signal reproducer 32 is a device which generates vibrations or the like on the basis of the tactile signals generated by the creator. The tactile signal reproducer 32 is formed into a vest shape so as to be worn by the user, or into a chair shape so as to be used by the user, for example. As a typical example, the tactile signal reproducer 32 in the shape of a vest will be described below.

Figure 3:
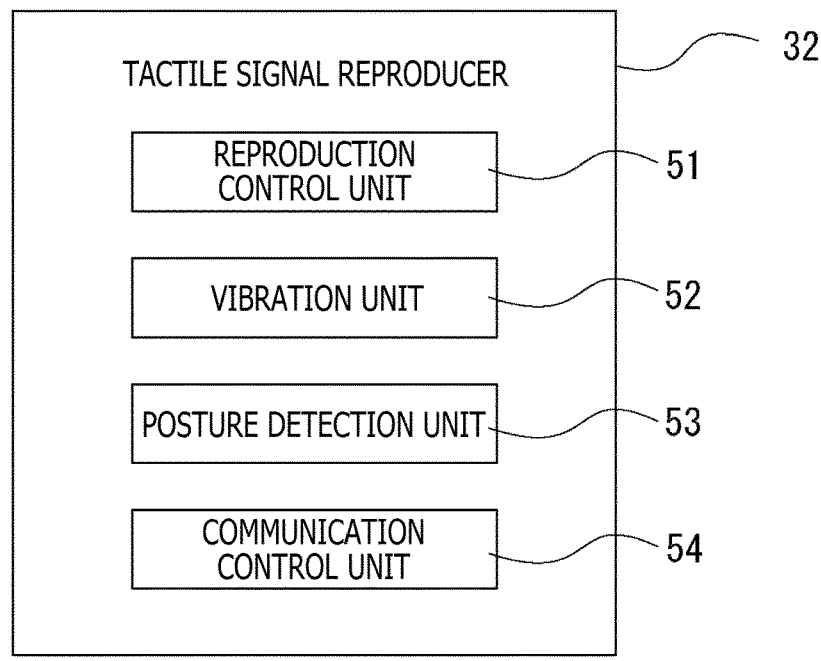
FIG. 3 is a block diagram depicting a functional configuration of a tactile signal reproducer.

The tactile signal reproducer 32 includes a reproduction control unit 51, vibration units 52, a posture detection unit 53 for detecting the posture of the user wearing the tactile signal reproducer 32, and a communication control unit 54 which receives tactile signals via wireless communication (see FIG. 3).

The information acquisition unit 41 of the presentation control apparatus 31 performs a process for acquiring "state information" indicating the state of the user including the posture of the user, "visual recognition information" indicating whether or not the user is viewing a video, "distance information" indicating a distance between the user and the screen 24, "device information" regarding the tactile signal reproducer 32, and other information. The state information, the visual recognition information, the distance information, the device information, and other information are used to determine whether or not to adjust reference tactile signals so as to provide an appropriate tactile stimulus for the user, for example.

Figure 5:
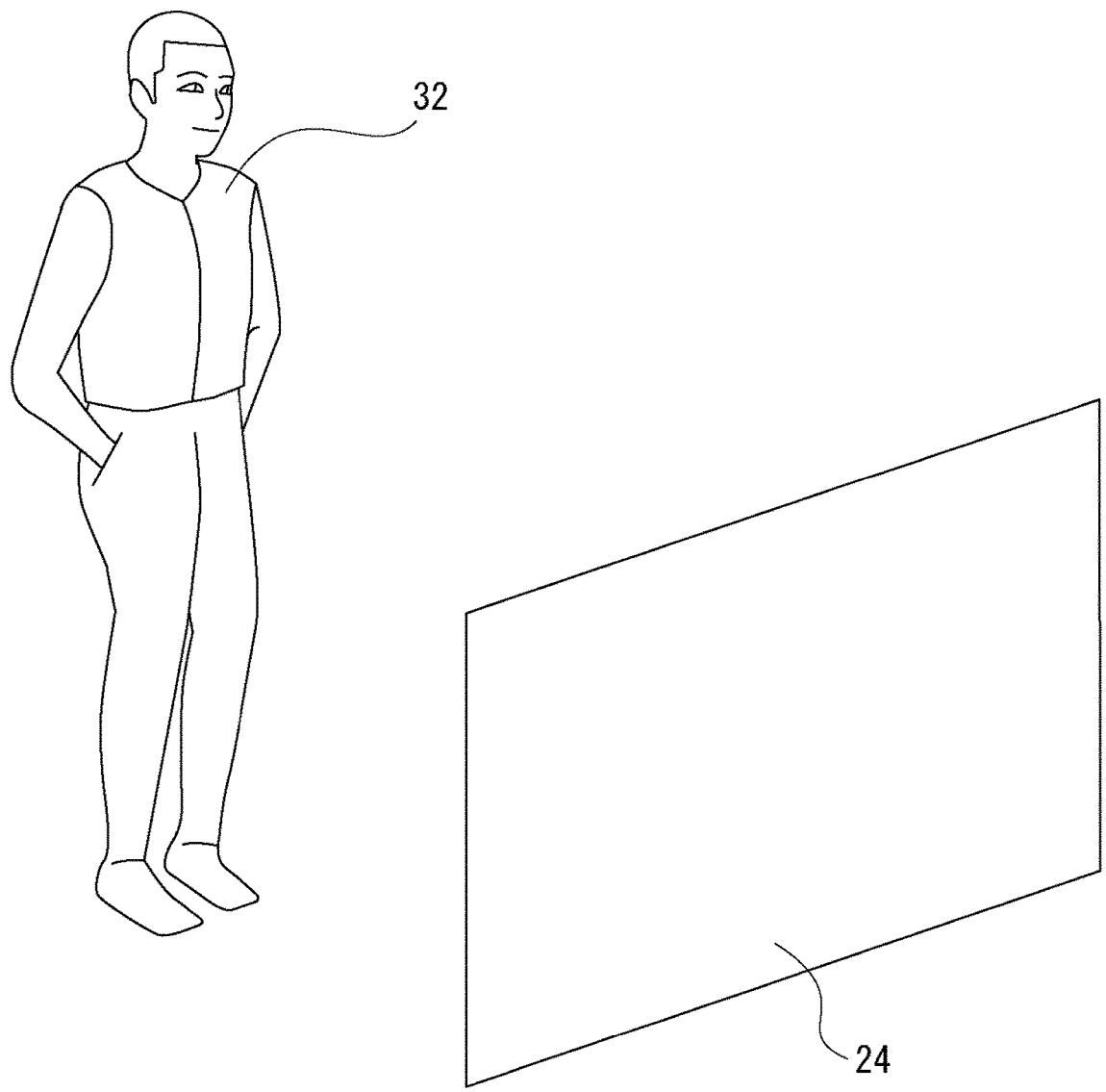
FIG. 5 is a diagram depicting a state of the user who is viewing and listening to content while standing upright.
Figure 6:
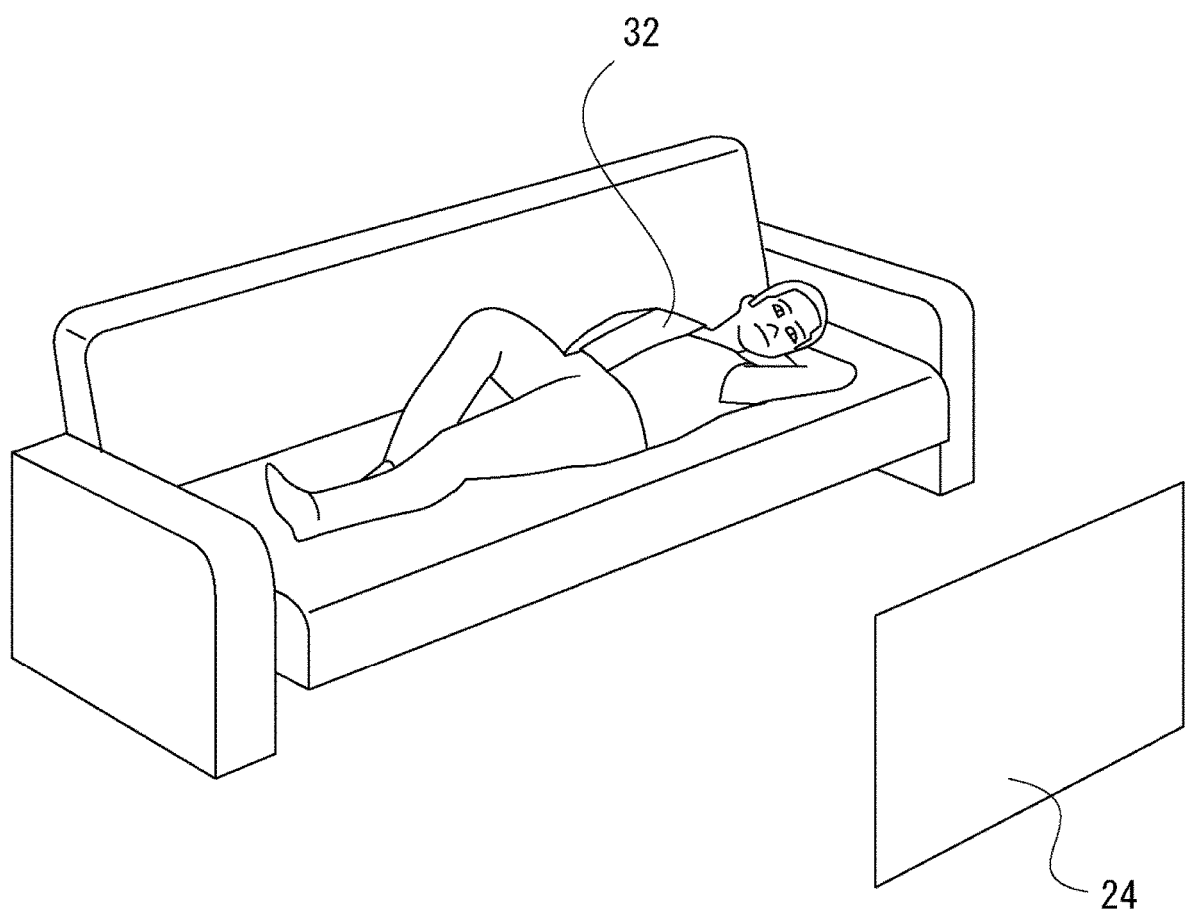
FIG. 6 is a diagram depicting a state of the user who is viewing and listening to content while lying down.

The state information is information indicating a state of the user, such as posture information regarding the posture of the user. For example, it is assumed that the state information varies depending on the posture of the user, for example, sitting on a chair (FIG. 4), standing upright (FIG. 5), or lying down (FIG. 6).

Figure 4:
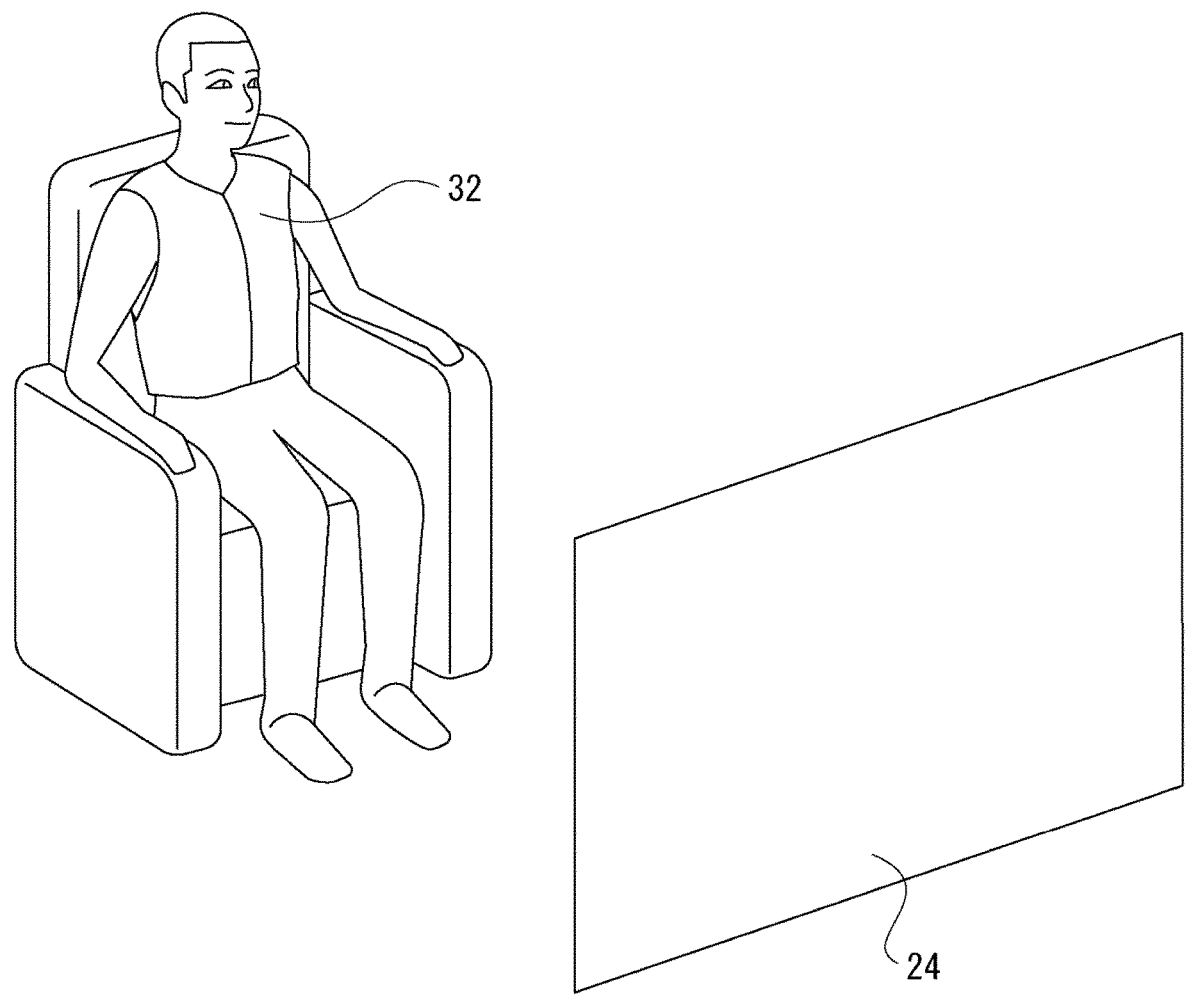
FIG. 4 is a diagram depicting a state of a user who is viewing and listening to content while sitting on a chair.
Figure 7:
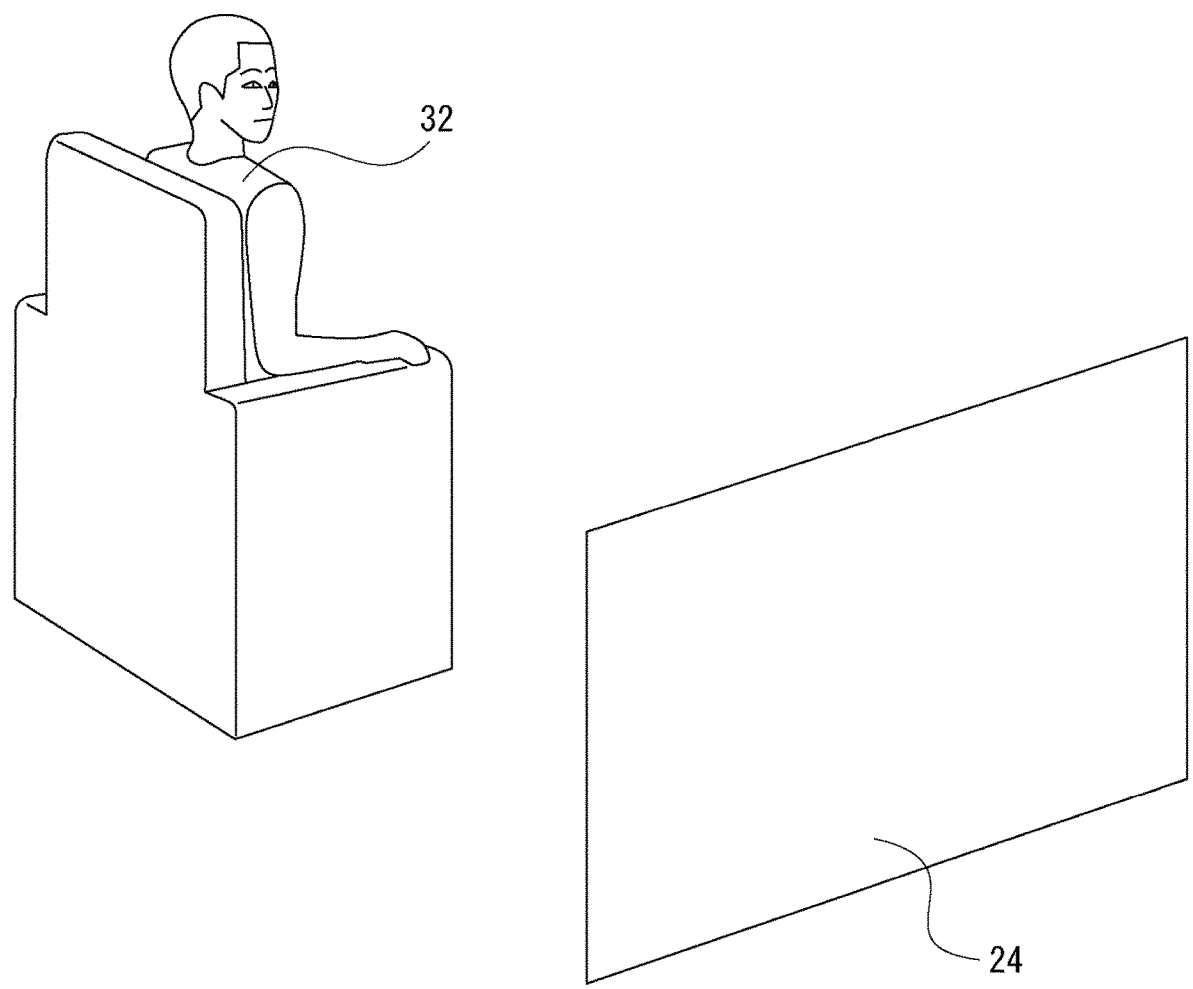
FIG. 7 is a diagram depicting a state of the user who is viewing and listening to content while sitting on a chair facing a side.

Moreover, it is assumed that the state information also varies depending on an orientation of the face of the user as well as the posture. For example, it is assumed that the state information regarding the posture of the user sitting on a chair and viewing a video displayed on a display device such as the screen 24 disposed in front of the user as depicted in FIG. 4 is different from the state information regarding the posture of the user sitting on a chair and viewing a video shifted to the screen 24 disposed on a side of the user as depicted in FIG. 7. In other words, the state information also contains information that enables identification of whether the user sitting down is facing the front or the side.

Figure 8:
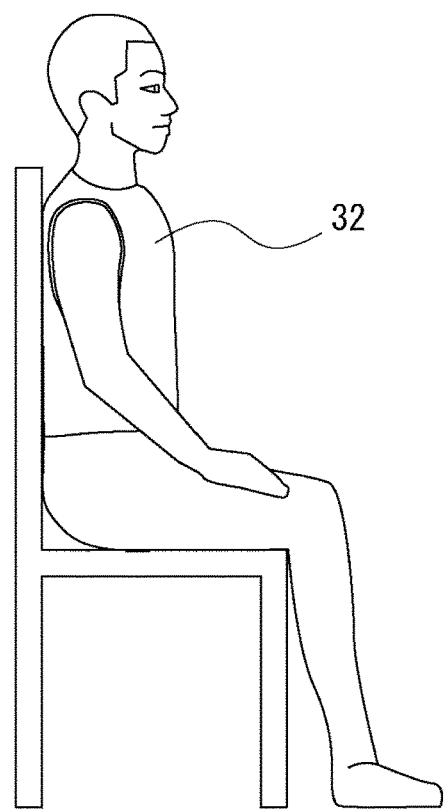
FIG. 8 is a diagram depicting a state of the user who is sitting on a chair with his or her back against a backrest.
Figure 9:
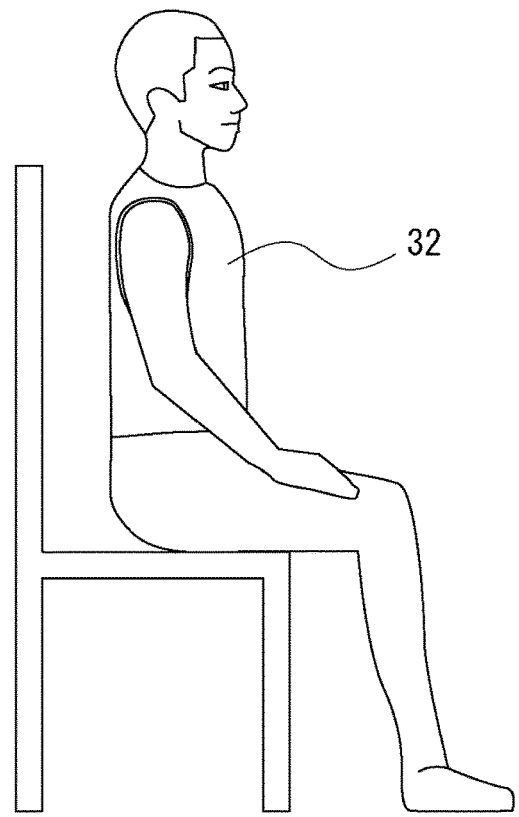
FIG. 9 is a diagram depicting a state of the user who is sitting on the chair with his or her back away from the backrest.

Furthermore, it is assumed that the state information also varies depending on a relation between the user and a chair or a sofa, as well as the posture and the orientation of the face. For example, it is assumed that the state information regarding the user sitting on a chair with his or her back against a backrest as depicted in FIG. 8 is different from the state information regarding the user sitting on the chair with his or her back away from the backrest as depicted in FIG. 9.

The information acquisition unit 41 may acquire the state information regularly or each time the state of the user changes. Alternately, the information acquisition unit 41 may acquire the state information only once, at the start of content reproduction, regardless of a change of the state of the user.

In the case where the state information regarding the user is regularly acquired, equipment which transmits the state information need not execute a process for determining whether or not to transmit the state information, for example. Accordingly, a reduction in processing loads can be achieved.

Moreover, in the case where the state information regarding the user is acquired each time the state of the user changes, necessary information is acquired at a necessary timing. Accordingly, a decrease in communication traffic and a reduction in communication processing loads can be achieved.

Furthermore, in the case where the state information is acquired only once regardless of a change of the posture of the user, a considerable reduction in communication traffic and processing loads upon the transmission and reception of the state information can be achieved.

The state information regarding the user may be acquired from the tactile signal reproducer 32 or from other equipment. For example, the tactile signal reproducer 32 includes an IMU (Inertial Measurement Unit) or a pressure-sensitive element and acquires the state information regarding the user, on the basis of information obtained from the IMU or the pressure-sensitive element.

Specifically, the information acquisition unit 41 may acquire IMU data from the tactile signal reproducer 32, and estimate the posture or the like of the user on the basis of the received IMU data, to acquire the state information. Alternatively, the tactile signal reproducer 32 may execute a process for estimating the posture of the user on the basis of IMU data, to acquire the state information from the tactile signal reproducer 32.

The device information is acquired from the tactile signal reproducer 32 as information regarding the tactile signal reproducer 32 and indicates the number of the vibration units 52 included in the tactile signal reproducer 32, positions of the vibration units 52, and frequency characteristics of the vibration units 52. These items of the device information are used to perform an adjustment process for reference tactile signals.

Note that characteristics information may be stored for each type of the devices in a DB as the device information, and the information acquisition unit 41 may acquire the device information from the DB on the basis of model number information or the like acquired from the tactile signal reproducer 32.

Note that reference tactile signals are generated on a premise that each reference tactile signal is reproduced by a specific tactile signal reproducer 32. Accordingly, in a case where reference tactile signals are reproduced by a tactile signal reproducer 32 different from the assumed tactile signal reproducer 32, adjustment of these reference tactile signals may possibly be required.

Therefore, it can be said that the device information is also information for identifying a difference between the assumed specific tactile signal reproducer 32 (reference device) and the tactile signal reproducer 32 currently used by the user. In addition, in a case where the tactile signal reproducer 32 currently used by the user is different from the reference device, the adjustment process described below is performed.

The visual recognition information is an example of information used to determine whether or not the user is concentrating on viewing and listening to content. For example, the visual recognition information can be acquired by image processing or on the basis of IMU information.

For example, an image used to acquire the visual recognition information may be any one of various types of images such as an image captured by an imaging apparatus disposed near the screen 24.

Moreover, IMU data may be collected in both a case where the user is concentrating on content and a case where the user enjoys the content while doing other things. Then, machine learning or the like may be applied to the collected IMU data to determine whether or not the user is currently concentrating on the content, thereby acquiring the visual information.

The distance information may be obtained by using various methods. For example, an imaging apparatus capable of outputting a range image may be disposed near the screen 24, and a distance between the user as a subject and the imaging apparatus may be calculated to obtain the distance information indicating a distance between the user and the screen 24.

The tactile signal acquisition unit 42 acquires, from the tactile DB 33, reference tactile signals that are yet to be adjusted.

The determination processing unit 43 performs a process for determining whether or not to adjust reference tactile signals. For example, the determination processing unit 43 determines to execute the adjustment process, in a case where the posture or the like of the user is different from a reference state. For example, suppose that a state of the user who is viewing the screen 24 disposed in front of the user while sitting on a chair with his or her back against a backrest (FIGS. 4 and 8) is set as the reference state. In such a case, when the user is standing upright (FIG. 5), lying down (FIG. 6), sitting on a chair facing a side (FIG. 7), or sitting on the chair with his or her back away from the backrest (FIG. 9), the determination processing unit 43 determines that the state of the user is different from the reference state, and decides to execute the adjustment process.

For example, in order to determine whether or not the posture or the like of the user is different from the reference state, IMU data or the like acquired in the reference state of the user may be stored as reference data, and a level of the deviation between IMU data currently acquired and the reference data may be determined.

Note that the determination processing unit 43 determines whether or not to adjust reference tactile signals, on the basis of other information, in some cases. For example, some reference tactile signals may not require the adjustment depending on tactile stimuli to be provided for the user. The creator may possibly designate such tactile signals corresponding to the tactile stimuli, as tactile signals for which adjustment is disabled or not required. The determination processing unit 43 acquires, as information indicating such designation, flag information or the like and determines whether or not to adjust reference tactile signals, on the basis of the acquired information.

Moreover, the user may set the flag information or the like indicating tactile signals for which adjustment is disabled or not required. The determination processing unit 43 may estimate that the user does not intend to adjust reference tactile signals, on the basis of user operation information or the like, and may determine not to adjust the reference tactile signals.

The identification information setting unit 44 adds a determination result obtained by the determination processing unit 43 to reference tactile signals, in a form of flag information or the like. This flag information is identification information used by the adjustment processing unit 45 to identify whether the reference tactile signals are tactile signals to be adjusted or not to be adjusted.

Each reference tactile signal may be a series of reference tactile signals to be provided for the user in one scene of a movie, or may be reference tactile signals contained in one packet data. Note that one packet data contains tactile signals that cause a tactile stimulus to be reproduced for a relatively short period of time in a range of several milliseconds to several hundreds of milliseconds, for example.

The adjustment processing unit 45 performs the adjustment process for reference tactile signals on the basis of the identification information added by the identification information setting unit 44 to each reference tactile signal, to generate adjusted tactile signals. For example, the adjusted tactile signals are tactile signals that have been adjusted to provide a tactile stimulus causing no sense of incongruity for the user determined to be in a state different from the reference state, which will be described in detail later.

The communication control unit 46 performs a process for transmitting and receiving information to and from the tactile signal reproducer 32 via wireless or wired communication. For example, the information to be transmitted to the tactile signal reproducer 32 includes reference tactile signals and adjusted tactile signals. In addition, the information to be received from the tactile signal reproducer 32 includes state information regarding the user and other information.

The reproduction control unit 51 of the tactile signal reproducer 32 outputs, to each of the vibration units 52, driving signals corresponding to tactile signals received from the presentation control apparatus 31 via wireless or wired communication.

It is assumed that each tactile signal contains control information regarding a time code to synchronize with reproduction content, for example. Specifically, each tactile signal contains information for specifying a time code and the vibration unit 52 to be driven, information for specifying an operation pattern, information indicating presentation strength of the tactile signal, and other information.

For example, each of the vibration units 52 is configured to vibrate by using an actuator included therein, and is capable of transmitting a tactile stimulus to an operator by being driven according to a tactile signal generated on the basis of a tactile signal.

For example, multiple vibration units 52 included in the tactile signal reproducer 32 are arranged such that six vibration units 52 are positioned on the front side (ventral side) of the operator wearing the tactile signal reproducer 32 and that four vibration units 52 are positioned on the back side of the operator. FIG. 1 depicts the six vibration units 52 arranged on the front side. The number and positions of the vibration units 52 may be varied according to the tactile signal reproducer 32 to be used.

Note that, in order to improve a sense of realism given by movie content, acoustic data which is output to the acoustic output apparatus 23 from the cinema system 2 and video data which is output to the projector 22 from the cinema system 2 need to be synchronized with driving signals which are output to the vibration units 52 from the reproduction control unit 51. For this purpose, the reproduction control unit 51 manages the time codes transmitted from the cinema system 2.

The communication control unit 54 communicates with the communication control unit 46 of the presentation control apparatus 31 by wireless or wired communication. In such a manner, the tactile signal reproducer 32 is capable of receiving reference tactile signals and adjusted tactile signals from the presentation control apparatus 31, and transmitting state information regarding the user and containing posture information to the presentation control apparatus 31.

<2. Adjustment Process>

Now, several examples of the adjustment process executed for tactile signals by the adjustment processing unit 45 of the presentation control apparatus 31 will be described.

<2-1. First Example of Adjustment Process>

In a first example of the adjustment process, a tactile stimulus which is provided for the user in one scene from a movie where the water level is gradually rising up from the feet of a movie character will be described.

This example will be explained in detail with reference to the accompanying figures.

Figure 10:
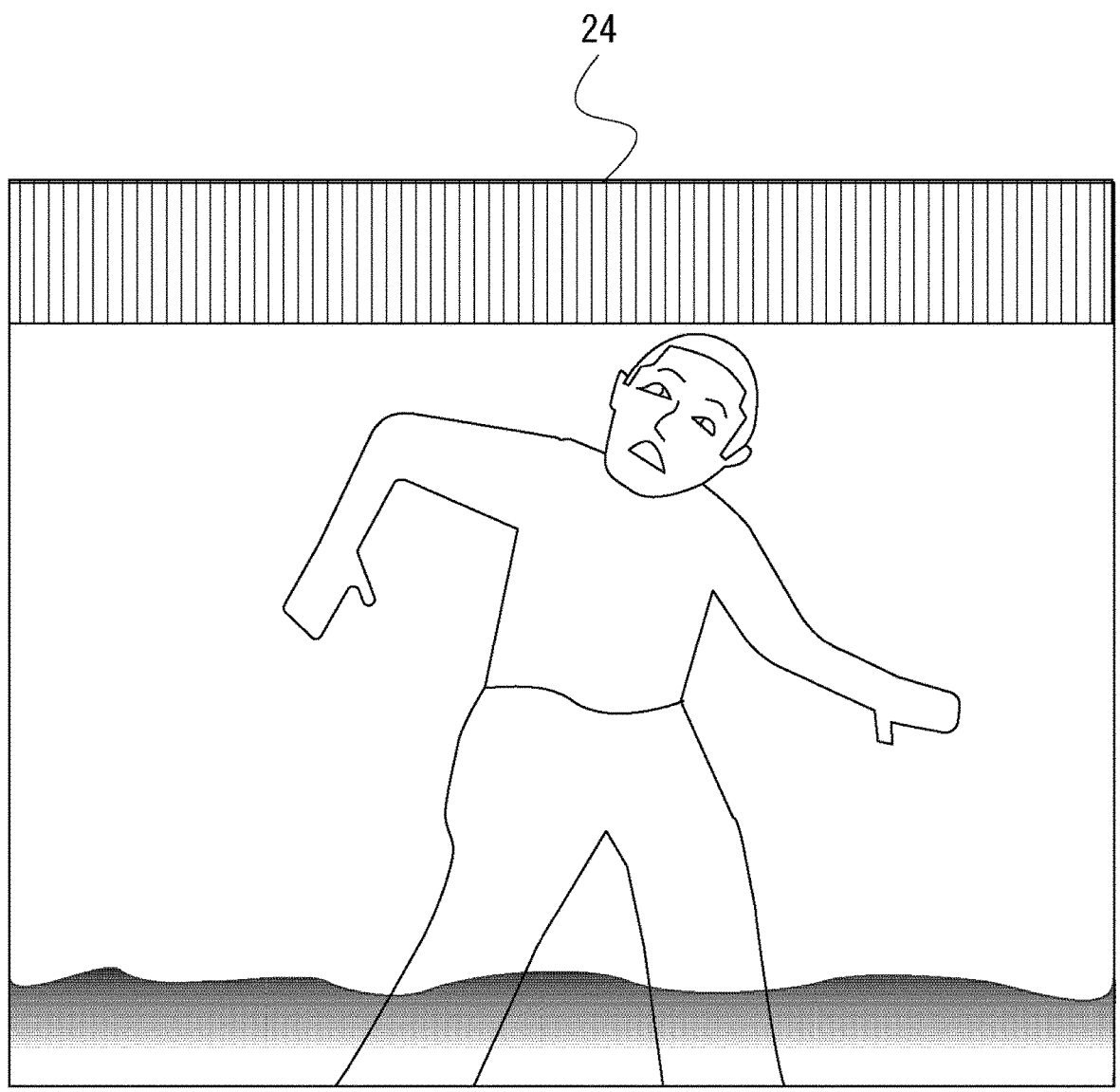
FIG. 10 is a diagram depicting a state of a screen displaying one scene from a movie where the water level is rising up from the feet of a movie character.

FIG. 10 is a diagram depicting a state of the screen 24 displaying one scene from a movie where the water level is rising up from the feet of a movie character. In order to make the user feel immersed in the story of the movie by allowing the user to experience the situation that the movie character is in, it is essential to provide an appropriate tactile stimulus according to situation information containing posture information regarding the user. In this case, a process for adjusting reference tactile signals may be performed sometimes.

Specifically, a tactile stimulus to be provided for the user is created on an assumption that the user is in an ordinary posture. For example, in a case where reference tactile signals are created on an assumption that the user is viewing and listening to content while sitting on a chair as depicted in FIG. 4, the posture of the user sitting on the chair is set as a reference posture. Meanwhile, in a case where reference tactile signals are created on an assumption that the user is sitting on the chair with the body directed diagonally upward by use of a reclining function of the chair, such a posture of the user is set as the reference posture.

Note that, even when the posture of the user is identical to the reference posture, the adjustment process may be executed sometimes in a case where the user is in a state different from the reference state. For example, in a case where reference tactile signals are created on an assumption that the user leans his or her back against a backrest of a chair, the posture of the user leaning his or her back against the backrest is set as the reference state. Even when the posture of the user is identical to the reference posture, the state of the user sitting on the chair with his or her back away from the backrest may possibly be determined to be different from the reference state which is assumed at the time of creation of reference tactile signals.

Supposing that the state depicted in FIG. 4 is set as the "reference state," in a case where a certain user is viewing and listening to content in a state similar to the state depicted in FIG. 4, reference tactile signals are transmitted to the tactile signal reproducer 32 worn by the user, without change.

Note that the adjustment of reference tactile signals may be required sometimes in a case where the positions, number, and characteristics of the vibration units 52 included in the tactile signal reproducer 32 are different from the assumed ones. In a case where such an adjustment process is performed by the presentation control apparatus 31, adjusted tactile signals obtained by adjusting reference tactile signals are transmitted to the tactile signal reproducer 32. Moreover, in a case where the adjustment process is performed by the tactile signal reproducer 32, reference tactile signals are transmitted to the tactile signal reproducer 32.

Here, a tactile stimulus to be given to the user who is in a reference state in a scene depicted in FIG. 10 will be described.

Figure 11:
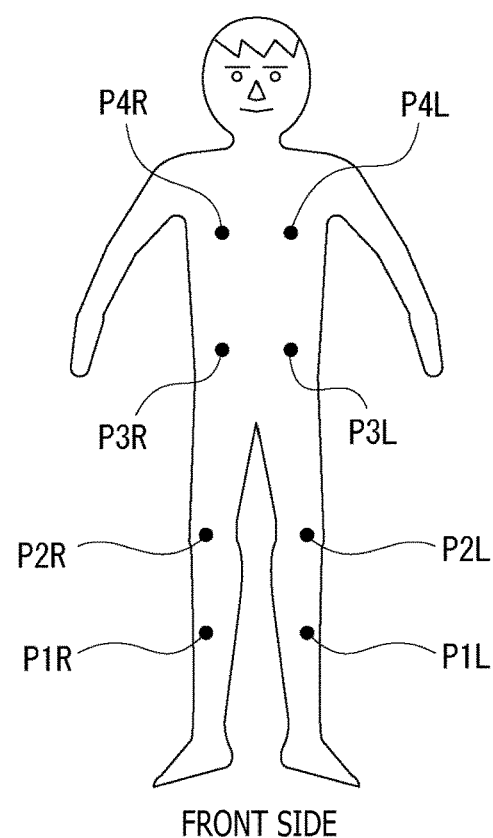
FIG. 11 is a schematic diagram depicting presentation positions, on a ventral side (front side) of the user, where a tactile stimulus is presented.

For example, with the tactile signal reproducer 32 worn or used by the user, stimuli can be given to eight points on the front side (ventral side) of the user. Specifically, a tactile stimulus can be given to each of the following portions of the user: left and right shin portions P1R and P1L, left and right knee portions P2R and P2L, left and right waist portions P3R and P3L, and left and right chest portions P4R and P4L (see FIG. 11).

Figure 12:
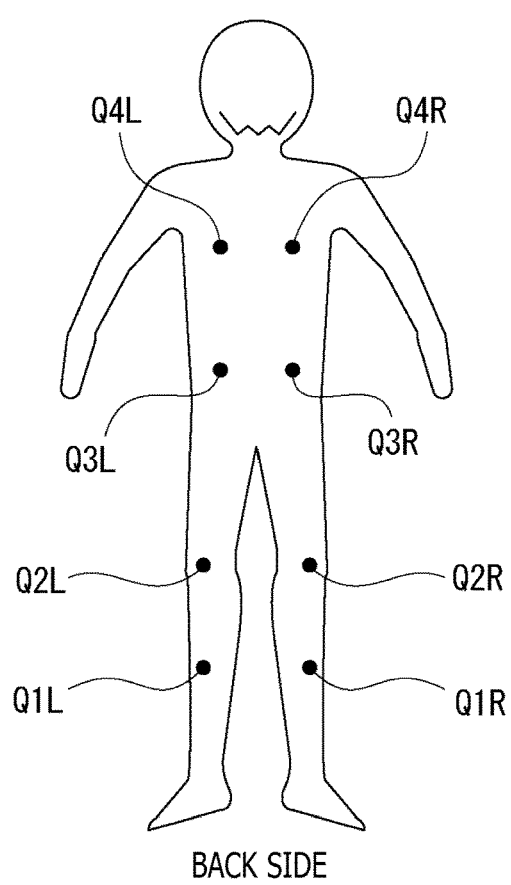
FIG. 12 is a schematic diagram depicting presentation positions, on a back side (rear side) of the user, where a tactile stimulus is presented.

Moreover, stimuli can also be given to eight points on the rear side (back side) of the user. Specifically, a tactile stimulus can be given to each of the following portions of the user: left and right shin portions Q1R and Q1L, left and right knee portions Q2R and Q2L, left and right waist portions Q3R and Q3L, and left and right shoulder blade portions Q4R and Q4L (see FIG. 12).

Figure 13:
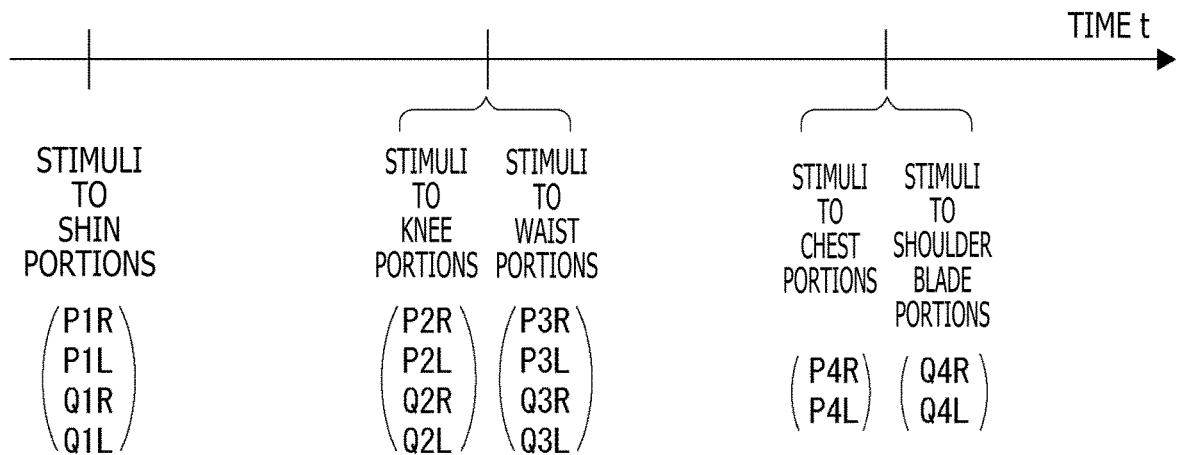
FIG. 13 is a diagram for explaining an example of a presentation order of tactile stimuli to be presented to the user.

For example, as depicted in FIG. 13, stimuli are given to the shin portions P1R, P1L, Q1R, and Q1L of such a user, and after a predetermined period of time has elapsed, the stimuli are then given to the knee portions P2R, P2L, Q2R, and Q2L and the waist portions P3R, P3L, Q3R, and Q3L substantially simultaneously. This is because the knees and the waist of the user sitting down are located at substantially the same height.

Thereafter, the stimuli are given to the chest portions P4R and P4L and the shoulder blade portions Q4R and Q4L of the user substantially simultaneously.

By giving the stimulus to each of the portions of the user at the timing depicted in FIG. 13, it becomes possible to make the user feel as if the water level is rising up from the feet of the user. Accordingly, a sense of realism can be enhanced.

Next, a tactile stimulus to be given to the user standing upright (see FIG. 5) in the scene depicted in FIG. 10 will be described.

Figure 14:
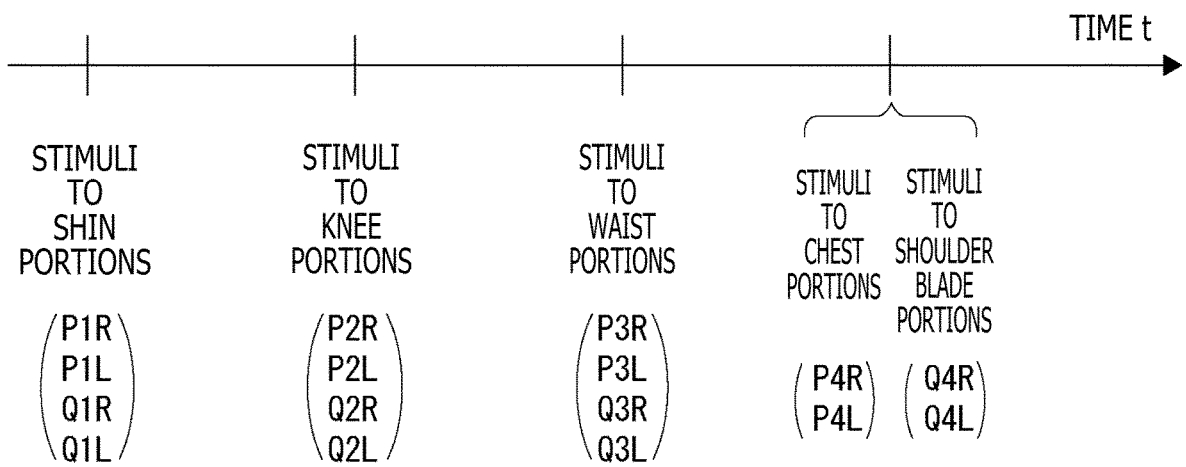
FIG. 14 is a diagram for explaining another example of the presentation order of the tactile stimuli to be presented to the user.

In this case, as depicted in FIG. 14, stimuli are given to the shin portions P1R, P1L, Q1R, and Q1L, and after a predetermined period of time has elapsed, the stimuli are then given to the knee portions P2R, P2L, Q2R, and Q2L. After a predetermined period of time has further elapsed, the stimuli are given to the waist portions P3R, P3L, Q3R, and Q3L. Then, after a predetermined period of time has further elapsed, the stimuli are given to the chest portions P4R and P4L and the shoulder blade portions Q4R and Q4L of the user substantially simultaneously.

By giving the stimulus to each of the portions of the user at the timing depicted in FIG. 14, i.e., giving the stimuli to the knee portions P2R, P2L, Q2R, and Q2L and the waist portions P3R, P3L, Q3R, and Q3L with a time difference between the knee portions and the waist portions, the user standing upright can feel as if the water level is rising up from the feet of the user. Accordingly, a sense of realism can be enhanced.

Next, a tactile stimulus to be given to the user lying down (see FIG. 6) in the scene depicted in FIG. 10 will be described.

Figure 15:
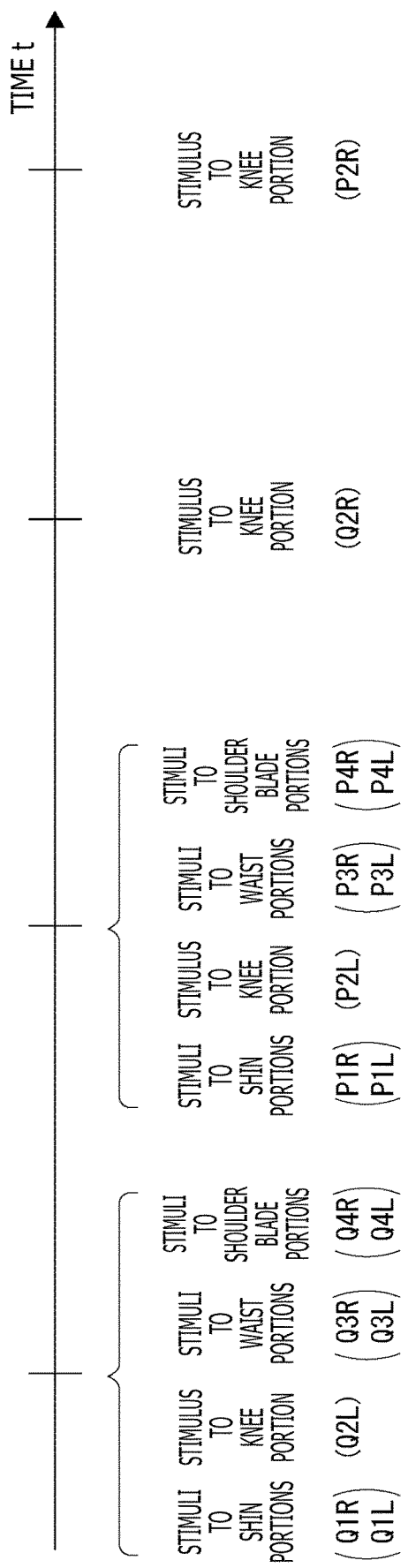
FIG. 15 is a diagram for explaining a further example of the presentation order of the tactile stimuli to be presented to the user.

In this case, stimuli are given to the shin portions Q1R and Q1L, the knee portion Q2L, the waist portions Q3R and Q3L, and the shoulder blade portions Q4R and Q4L substantially simultaneously as depicted in FIG. 15.

After a predetermined period of time has elapsed, the stimuli are subsequently given to the shin portions P1R and P1L, the knee portion P2L, the waist portions P3R and P3L, and the chest portions P4R and P4L substantially simultaneously.

After a predetermined period of time has further elapsed, the stimulus is given to the knee portion Q2R. Then, after a predetermined period of time has further elapsed, the stimulus is given to the knee portion P2R.

By giving the stimulus to each of the portions of the user at the timing depicted in FIG. 15, the user lying down can feel as if the user is gradually sinking in the water from the back side. Accordingly, a sense of realism can be enhanced.

Note that the stimuli are lastly given to the right knee portions Q2R and P2R because the user is lying down while bending the right knee as depicted in FIG. 6.

In a case where the user is lying on his or her left side, it is preferable to give vibrations initially to the portions on the left side of the body and then to the portions on the right side of the body.

Note that, if the user is sitting down while facing the side as depicted in FIG. 7, tactile stimuli are only required to be given to the user at the timing depicted in FIG. 13. This is because height positions of the respective portions of the user sitting down as depicted in FIG. 7 are similar to those of the user sitting down as depicted in FIG. 4, and the tactile stimulus that should sequentially be transmitted from bottom to top is preferably be given in a similar order.

On the other hand, as in a scene of a blast, there is a case where a tactile stimulus should preferably be given to the user sequentially from a portion which is the closest to the screen 24 to a portion which is the farthest from the screen 24. In such a case, it is preferable that the order of giving the tactile stimuli to the portions be made different between the user sitting on a chair facing the screen 24 as depicted in FIG. 4 and the user sitting on a chair facing a side away from the screen 24 as depicted in FIG. 7.

<2-2. Second Example of Adjustment Process>

In a second example of the adjustment process, an example where presentation of a tactile stimulus is stopped according to state information regarding the user and other examples will be described.

In a case of detecting that the user is not concentrating on content, e.g., a case of acquiring, as visual recognition information, information indicating that the user is not visually recognizing the screen 24, the presentation control apparatus 31 may stop presentation of a tactile stimulus from the tactile signal reproducer 32 worn by the user.

Moreover, in a case where there is a considerable deviation between the reference posture and the posture of the user, tactile presentation may be suspended. Specifically, in a case where the deviation between IMU data (reference data) acquired in the reference state of the user and IMU data currently acquired exceeds a predetermined threshold, adjustment of tactile signals by the adjustment process is determined to be disabled, and tactile presentation is stopped.

Alternatively, one or more reference postures (e.g., the posture depicted in FIG. 4, the posture depicted in FIG. 5, the posture depicted in FIG. 6, and the posture depicted in FIG. 7) may be designated by the creator of tactile signals, and adjustment of tactile signals may be determined to be disabled in a case where the current posture is different from these reference postures.

In a case where presentation of a tactile stimulus is to be stopped, various methods may be adopted.

For example, presentation of a tactile stimulus may be stopped by suspending transmission of tactile signals from the presentation control apparatus 31 to the tactile signal reproducer 32.

Alternatively, presentation of a tactile stimulus may be stopped by causing the tactile signal reproducer 32 not to reproduce tactile signals transmitted thereto from the presentation control apparatus 31.

Moreover, in a case where the presentation of a tactile stimulus is to be stopped, presentation of all tactile stimuli to the user may be stopped, or some of the tactile stimuli may be stopped to allow the user to enjoy content at a minimum level.

Figure 16:
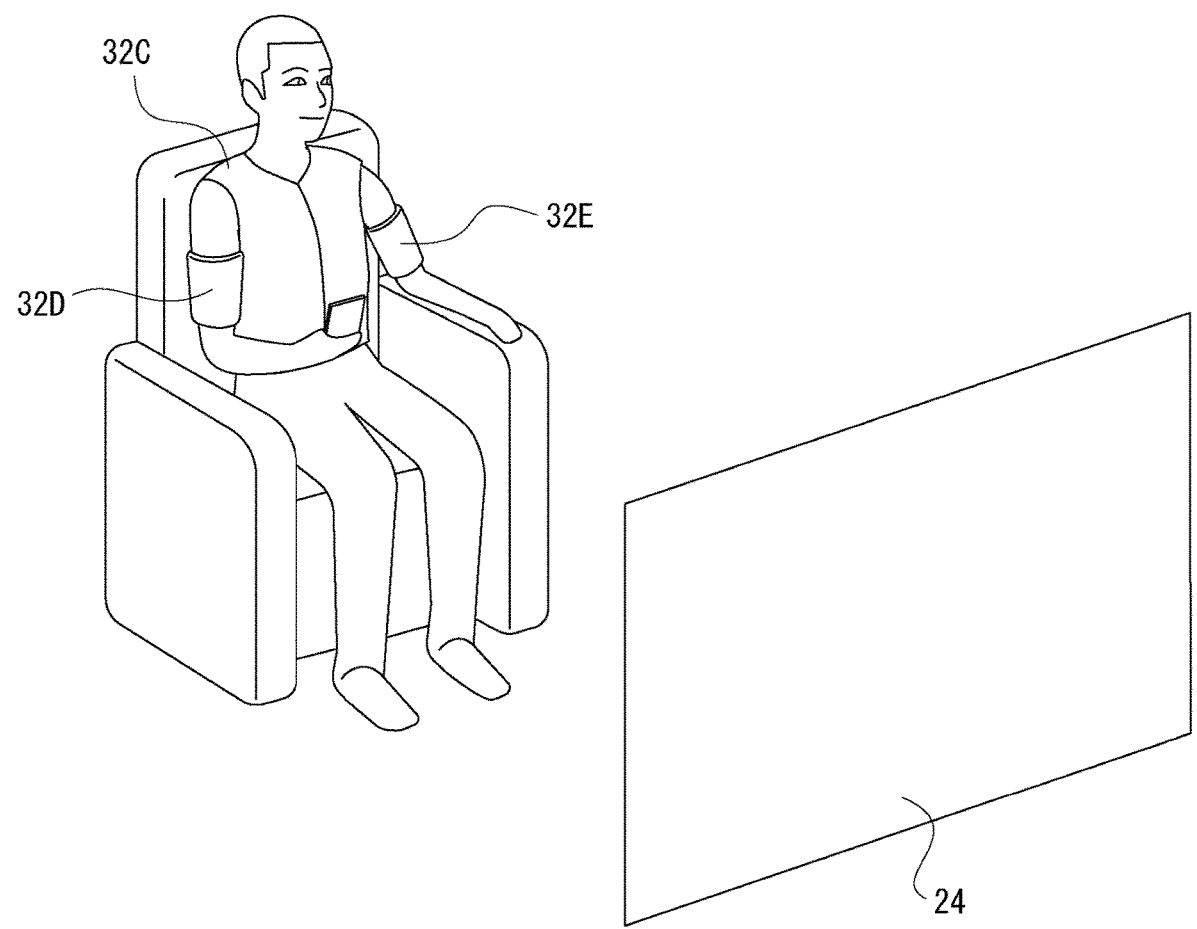
FIG. 16 is a diagram depicting a state of the user who is viewing and listening to content while doing a different action.

For example, a case where the user enjoys watching content while sitting on a chair and starts operating a small-sized terminal device such as a smartphone by the right hand of the user as depicted in FIG. 16 will be described.

The user is wearing a tactile signal reproducer 32C in the shape of a vest, a tactile signal reproducer 32D for the right arm, and a tactile signal reproducer 32E for the left arm.

The presentation control apparatus 31 acquires, as state information regarding the user, information indicating that the user has started the operation of the smartphone, information indicating that a line of sight of the user has shifted from the screen 24, information indicating that a screen of the smartphone gets bright, or other information. These items of information may be acquired from the tactile signal reproducers 32 worn by the user, the smartphone operated by the user, or an imaging apparatus disposed near the screen 24 or other places, for example.

In response to acquisition of such state information as described above, the presentation control apparatus 31 stops tactile presentation by the tactile signal reproducer 32D worn on a portion of the right arm operating the small-sized terminal. On the other hand, tactile presentation by the tactile signal reproducer 32C and the tactile signal reproducer 32E continues.

In such a manner, the user can continue the operation of the smartphone without receiving such a tactile stimulus as to interrupt the operation of the smartphone, and simultaneously enjoy a tactile stimulus corresponding to content.

<2-3. Third Example of Adjustment Process>

In a third example of the adjustment process, a case where reference tactile signals are adjusted according to a combination of state information regarding the user and device information will be described.

This example will be explained in detail with reference to the accompanying figures.

Now, an example where the vibration units 52 included in the tactile signal reproducer 32 in the shape of a vest worn by the user are disposed at different positions will be described.

Figure 17:
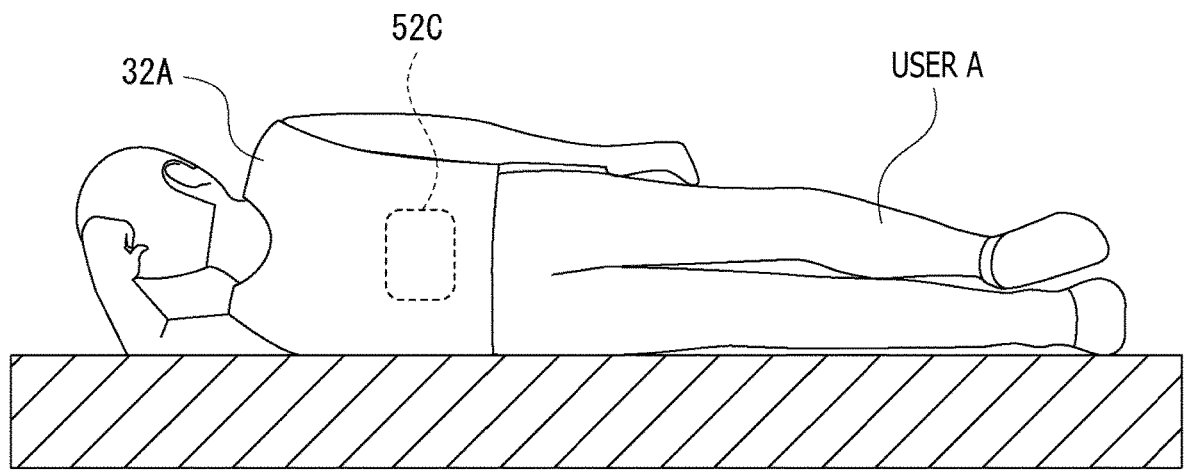
FIG. 17 is a diagram for explaining an example where vibration strength of a vibration unit included in a tactile signal reproducer is varied according to the posture of the user and a position of the vibration unit.

FIG. 17 depicts an example where a user wears a tactile signal reproducer 32A in the shape of a vest including one vibration unit 52C at a waist portion on the back side of the user.

Figure 18:
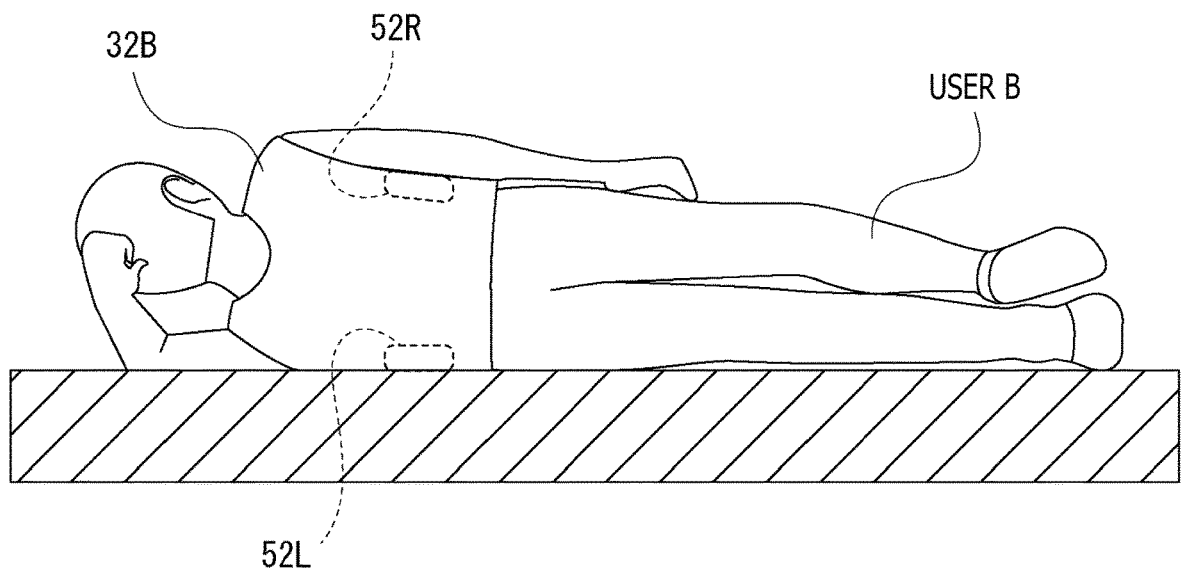
FIG. 18 is a diagram for explaining an example where vibration strength of vibration units included in a tactile signal reproducer is varied according to the posture of the user and the positions of the vibration units.

In addition, FIG. 18 depicts an example where a user wears a tactile signal reproducer 32B in the shape of a vest including the vibration units 52 at waist portions on the left and right sides of the user one for each. It is assumed in the following description that the vibration unit 52 on the left waist is a vibration unit 52L and that the vibration unit 52 on the right waist is a vibration unit 52R.

It is assumed that the user wearing either one of the foregoing tactile signal reproducers 32 is lying on his or her left side.

It is assumed that the vibration unit 52L on the left waist comes into closer contact with the body of the user and a sofa (ground) than the vibration unit 52C and the vibration unit 52R. If the vibration unit 52L in this state is vibrated with vibration strength similar to vibration strength of each of the vibration unit 52C and the vibration unit 52R, the user feels stronger vibrations from the vibration unit 52L than vibrations of the vibration unit 52R on the right waist.

Hence, with the vibration strength of the vibration unit 52L reduced to strength lower than the vibration strength of the vibration unit 52R, for example, the user can feel vibrations with similar strength at the left and right waist portions. Moreover, a tactile stimulus is provided for the user by using the two vibration units 52R and 52L in the mode depicted in FIG. 18, while a tactile stimulus is provided for the user by using the one vibration unit 52C in the mode depicted in FIG. 17.

Accordingly, it is considered to vibrate the vibration unit 52C with higher strength than that of the vibration unit 52R. Specifically, it is considered to increase vibration strength in the order of the vibration unit 52L<the vibration unit 52R<the vibration unit 52C.

In such a manner, similar tactile stimuli can be provided for the users wearing the tactile signal reproducers 32A and 32B of different types. In other words, appropriate tactile stimuli causing no sense of incongruity can be provided for both of the users.

Note that such an adjustment process is a process required depending on a combination of the posture of the user and device information (e.g., positions of the vibration units 52). Specifically, a different adjustment process is required if the combination of the posture of the user and the device information changes.

In a case where tactile stimuli are given to the left and right waist portions of the user at the same timing in the present embodiment, a vibration timing may be adjusted according to the positions of the vibration units 52.

Specifically, if a timing for vibrating the vibration unit 52C of the tactile signal reproducer 32A worn by a user A depicted in FIG. 17 is the same as a timing for vibrating the vibration units 52L and 52R of the tactile signal reproducer 32B worn by a user B depicted in FIG. 18, a timing at which the user A feels the tactile stimuli at the left and right waist portions may be delayed from that of the user B in some cases. This delay is produced because it takes time for the tactile stimulus to reach the left and right waist portions of the user from the vibration unit 52C.

In such a case, it is preferable to make the timing for vibrating the vibration unit 52C slightly earlier than the timing for vibrating the vibration units 52L and 52R.

This makes it possible to give the tactile stimuli at the same timing to the left and right waist portions of each of the users wearing the tactile signal reproducers 32A and 32B of different types.

There are other examples in this point. For example, in a case of giving a tactile stimulus to the back side of the user, there is a difference in the way of transmitting vibrations between the tactile signal reproducer 32 including the vibration unit 52 disposed on the back side and the tactile signal reproducer 32 including the vibration unit 52 disposed not on the back side but on the ventral side. In such a case, taking the difference into account, it is considered to delay the timing for vibrating the vibration unit 52 on the ventral side so as to make its vibration generation timing different from that of the vibration unit 52 on the back side.

Further, characteristics of the vibration units 52 may be taken into consideration so as to make the user feel vibrations with appropriate strength in the present embodiment.

For example, a case where reproducible vibration strength varies depending on the type of the vibration unit 52 is described by way of example. If the vibration unit 52 having low reproducible vibration strength is used to generate strong vibrations, there is a possibility that the vibration unit 52 cannot produce stronger vibrations even in a scene where such stronger vibrations need to be generated. As a consequence, expressiveness produced by the difference in vibration levels is deteriorated, and it becomes difficult to allow the user to feel an appropriate tactile stimulus.

In such a case, it is preferable to re-scale strength of a tactile stimulus according to minimum strength and maximum strength reproducible by the vibration unit 52. This makes it possible to provide an appropriate tactile stimulus for each of the users even if the postures of the users or the performance and characteristics of the tactile signal reproducers 32 are different.

Furthermore, the characteristics of the vibration units 52 may be taken into account by considering frequency characteristics of the vibration units 52.

For example, in a case where considerable attenuation is exhibited in a high band of vibrations output from any of the vibration units 52, a gain in the high band may be raised to handle this attenuation.

<2-4. Fourth Example of Adjustment Process>

In a fourth example of the adjustment process, an example of the adjustment process performed according to distance information indicating a distance between the user and the screen 24 will be described.

For example, it is considered to decrease intensity of tactile signals as the distance between the user and the screen 24 is longer.

It is preferable that such an adjustment process based on the distance information be carried out in conjunction with state information regarding the user.

Figures 19, 20:
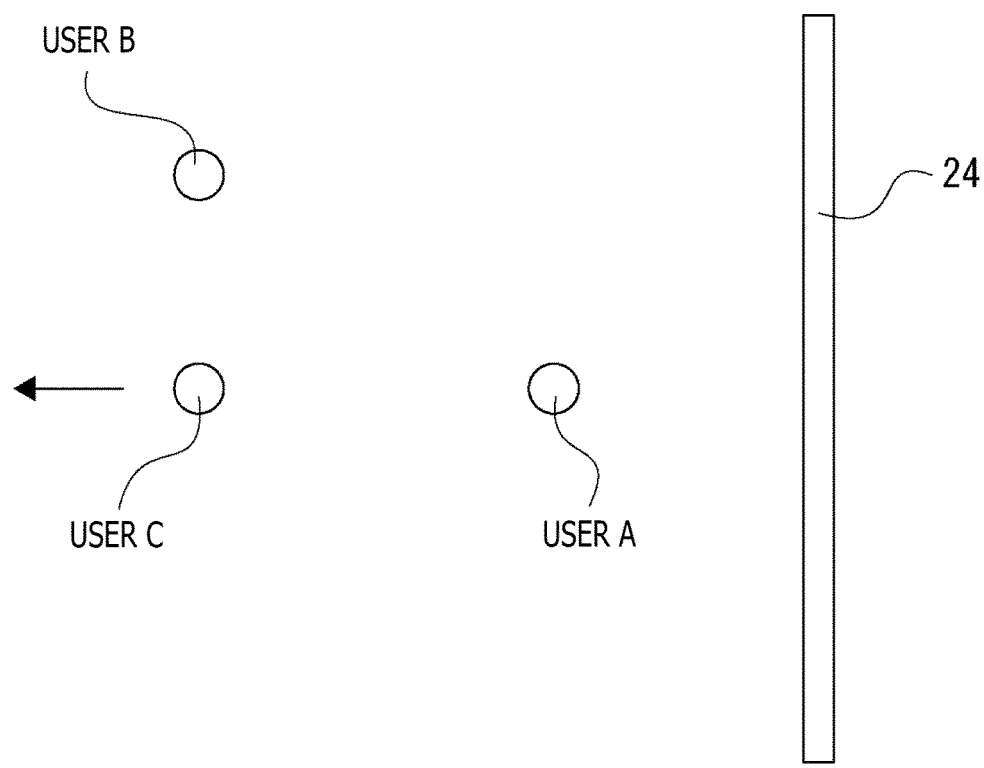
FIG. 19 is a diagram for explaining an example where a tactile stimulus to be presented is varied according to state information and distance information regarding the user.
FIG. 20 is a diagram depicting an example of a structure of data to be transmitted from the presentation control apparatus to the tactile signal reproducer.

For example, intensity of tactile signals to be transmitted to a user B located at a distance from the screen 24 is made lower than intensity of tactile signals to be transmitted to a user A located near the screen 24 as depicted in FIG. 19. This makes it possible to allow each of the users to experience an appropriate tactile stimulus corresponding to the distance from the screen 24.

It is assumed herein that the users A and B enjoy content in the reference posture (e.g., sitting on a chair) and that a user C is standing and moving away from the screen 24. The user C in such a state is considered to be leaving his or her seat.

In this case, it is considered to decrease intensity of tactile signals for the user C more than that for the user B or stop presentation of a tactile stimulus.

In such a manner, an appropriate tactile stimulus corresponding to each user can be provided by adjusting tactile signals on the basis of both the state information regarding the user and the distance information.

<3. Notification Process>

The communication control unit 46 of the presentation control apparatus 31 is capable of performing transmission control for giving various types of notifications to the user. Several notification examples will be described herein.

The communication control unit 46 performs a process for giving a notification that a tactile stimulus to be provided for the user is based on not the reference tactile signals but the adjusted tactile signals obtained by the adjustment. This process is executed in response to completion of the adjustment process performed by the adjustment processing unit 45.

The user having received such a notification can recognize not only the fact that the user is feeling the tactile stimulus produced with optimum adjustment, but also the fact that the current posture is not the reference posture.

Moreover, in a case of a stop of tactile presentation, the communication control unit 46 performs a process for notifying the user of the fact that tactile presentation has been stopped. For example, this process is executed in a case of detection that the user is not visually recognizing the screen 24, a case of an excessive deviation between the posture of the user and the reference posture, or other cases as described in the second example of the adjustment process.

The user having received such a notification can recognize a current state such as a state where presentation of the tactile stimulus has been stopped and a state where the self-posture excessively deviates from the reference posture.

The various types of notification processes described above are performed by transmission of packetized data from the presentation control apparatus 31 to the tactile signal reproducer 32.

FIG. 20 depicts an example of a packet data structure. The packet data has a header, a payload, and a footer. The header may contain various types of control information, a synchronized signal, or the like. In addition, the footer may contain various types of control information, parity information, or the like.

At the time of transmission of a tactile signal to the tactile signal reproducer 32, data of the tactile signal is stored in the payload.

Similarly, data indicating the details of the notification may be stored in the payload and transmitted in the notification process. In such a mode, however, it is necessary to generate packet data for the notification process and transmit this packet data.

To avoid this necessity, the details of the notification may be contained in packet data generated for transmission of a tactile signal. In such a case, however, the packet data is elongated if the data indicating the details of the notification is stored in the payload. Accordingly, the details of the notification may be stored in a portion of the header or the footer.

A period of time during which a tactile stimulus is reproduced by one packet data herein is extremely short, for example, in a range of several milliseconds to several tens of milliseconds. Accordingly, in order to present a tactile stimulus continuing for a long period of time such as several seconds, multiple packets such as several packets to several tens of packets are used.

At this time, even if an area of 1 bit for the notification process is secured for each of the header and the footer, an area of several bits to several tens of bits can be secured for a series of the entire packets used for one tactile presentation.

Accordingly, efficient data transmission can be achieved by storing transmission data for the notification process in multiple pieces of packet data.

Such a method is applicable to not only transmission data for the notification process, but also various types of control data transmitted from the presentation control apparatus 31 to the tactile signal reproducer 32, for example.

Note that the tactile signal reproducer 32 having received control information and notification information by such a method as described above is capable of restoring received data by executing a process for restoring the control information and the notification information from multiple pieces of packet data.

<4. Configuration of Computer Apparatus>

Each of the presentation control apparatus 31 and the tactile signal reproducer 32 described above has a configuration of a computer apparatus to implement the respective functions described above. Note that each of the apparatuses and equipment need not include all of constitutions described below, and may include only some of these.

Figure 21:
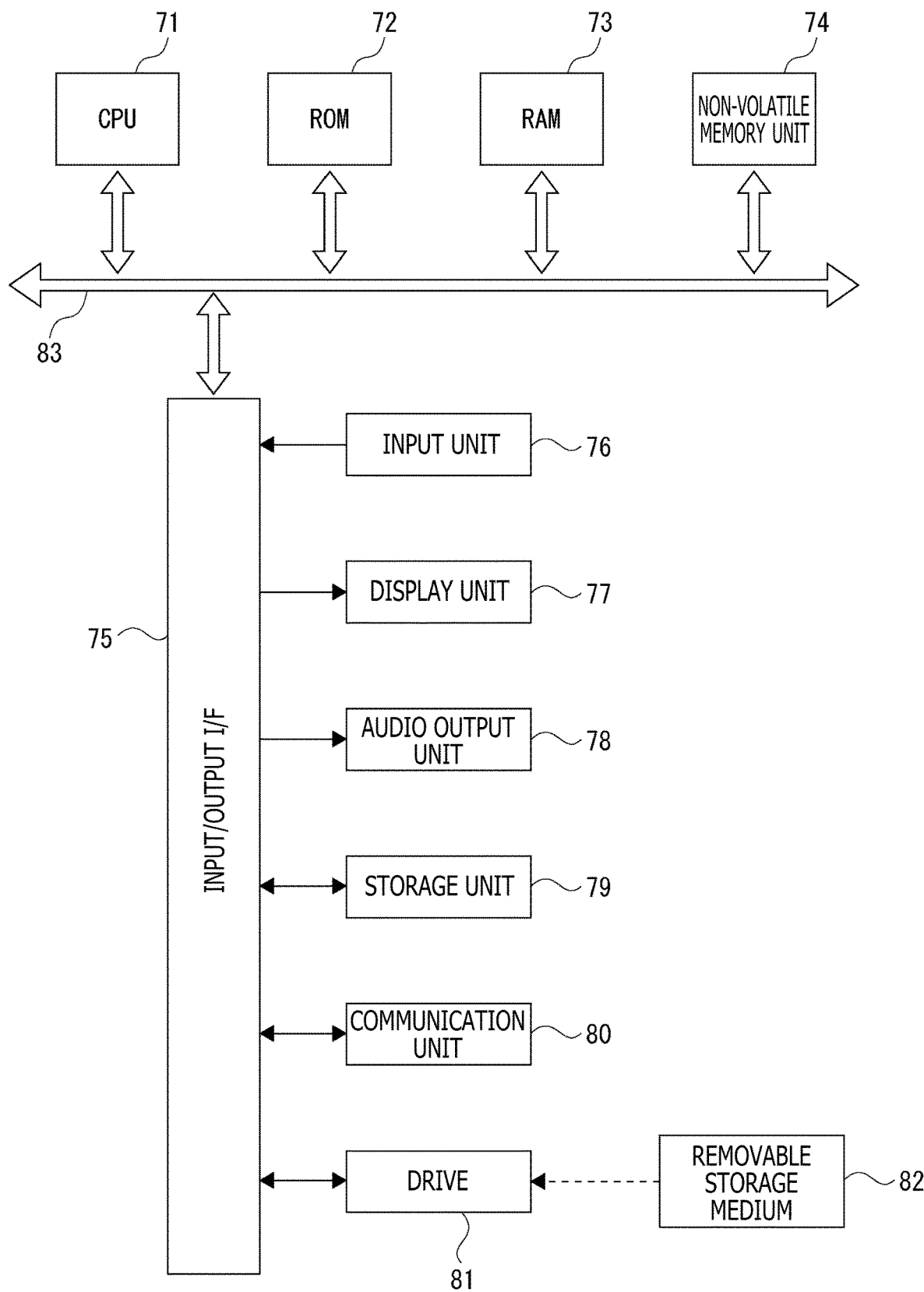
FIG. 21 is a block diagram of a computer apparatus.

As depicted in FIG. 21, a CPU 71 of each piece of equipment executes various types of processes according to a program stored in a ROM 72 or in a non-volatile memory unit 74 such as an EEP-ROM (Electrically Erasable Programmable Read-Only Memory), or a program loaded from a storage unit 79 to a RAM 73. In addition, data and the like necessary for the CPU 71 to execute various types of processes are stored in the RAM 73 as necessary.

The CPU 71, the ROM 72, the RAM 73, and the non-volatile memory unit 74 are connected to one another via a bus 83. An input/output interface 75 is also connected to the bus 83.

An input unit 76 including an operator and an operation device is connected to the input/output interface 75.

For example, the input unit 76 is assumed to include various types of operators and operation devices such as a keyboard, a mouse, a key, a dial, a touch panel, a touch pad, and a remote controller.

An operation performed by the user is detected by the input unit 76, and a signal corresponding to the input operation is interpreted by the CPU 71.

Moreover, a display unit 77 including an LCD, an organic EL panel, or the like, and an audio output unit 78 including a speaker or the like are integrally or separately connected to the input/output interface 75.

The display unit 77 is a display unit which displays various items, and includes a display device provided on a housing of the computer apparatus, a separated display device connected to the computer apparatus, or the like, for example.

The display unit 77 displays images for various types of image processing, moving images to be processed, and the like on a display screen on the basis of instructions from the CPU 71. Moreover, the display unit 77 displays various types of operation menus, icons, messages, and others, i.e., a GUI (Graphical User Interface), on the basis of instructions from the CPU 71.

In a certain case, a storage unit 79 including a hard disk, a solid-state memory, or the like, and a communication unit 80 including a modem or the like, are connected to the input/output interface 75.

The communication unit 80 performs a communication process via a transfer path such as the Internet, or communicates with various types of equipment by wired/wireless communication, bus communication, or the like.

In addition, a drive 81 is connected to the input/output interface 75 if necessary. A removable storage medium 82 such as a magnetic disk, an optical disk, a magneto-optical disk, or a semiconductor memory is attached to the drive 81 as necessary.

Data files such as image files, various types of computer programs, and the like are readable from the removable storage medium 82 by using the drive 81. The read data files are stored in the storage unit 79, or images and sounds contained in the data files are output from the display unit 77 and the audio output unit 78. Moreover, the computer programs and the like read from the removable storage medium 82 are installed in the storage unit 79 if necessary.

For example, software for the processing in the present embodiment can be installed in this computer apparatus via network communication provided by the communication unit 80 or via the removable storage medium 82. Alternatively, this software may be stored in the ROM 72, the storage unit 79, or the like beforehand.

When the CPU 71 executes processing operations under various types of programs, information processing and communication processing that are necessary for the presentation control apparatus 31 and the tactile signal reproducer 32 are executed.

Note that an information processing apparatus constituting each of the presentation control apparatus 31 and the tactile signal reproducer 32 is not limited to the single computer apparatus depicted in FIG. 21, and may include multiple systematized computer apparatuses. The multiple computer apparatuses may be systematized by using a LAN or the like, or may be disposed in remote areas through a VPN connection or the like using the Internet or the like. The multiple information processing apparatuses may include an information processing apparatus as a server group (cloud) made available by a cloud computing service.

<5. Processing Example>

Now, with reference to the accompanying figures, a process executed by the CPU 71 of the presentation control apparatus 31 to achieve the respective types of examples described above will be described.

Figure 22:
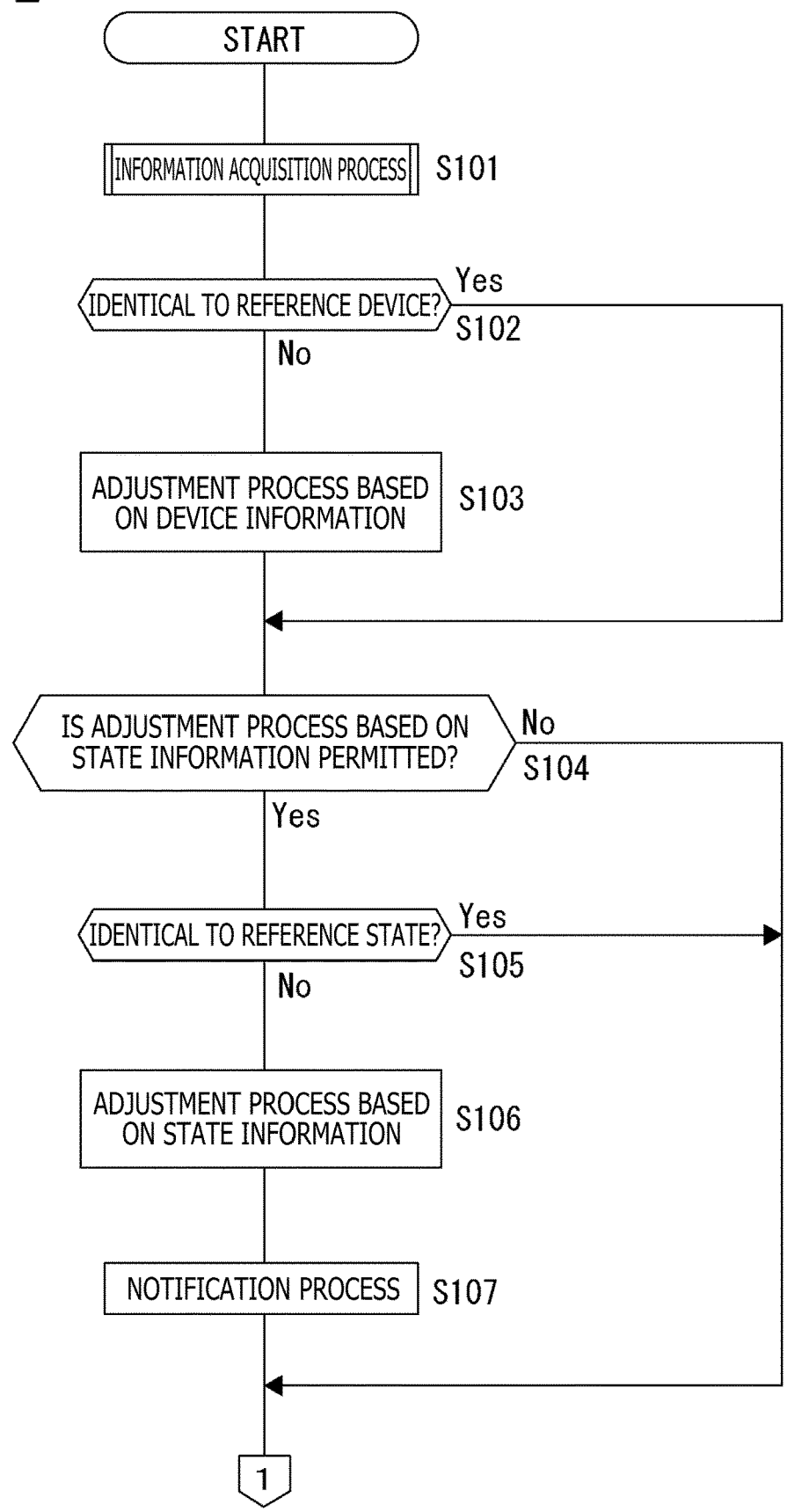
FIG. 22 is a flowchart illustrating an example of a process executed by the presentation control apparatus.

In step S101 in FIG. 22, the CPU 71 of the presentation control apparatus 31 executes an information acquisition process. In the information acquisition process, information necessary for executing the respective types of processes described above is acquired.

Figure 24:
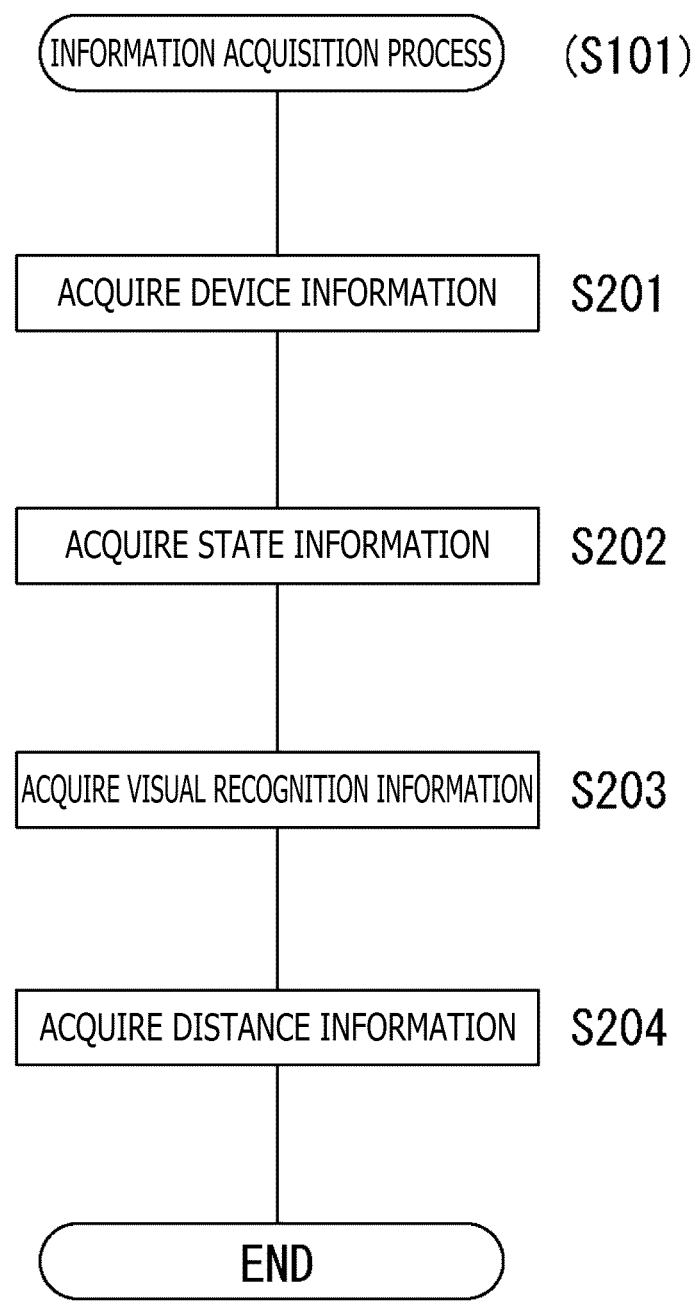
FIG. 24 is a flowchart illustrating an example of an information acquisition process.

FIG. 24 illustrates an example.

In the information acquisition process, the CPU 71 of the presentation control apparatus 31 first acquires device information in step S201. The device information is a process for acquiring information indicating the number, arrangement positions, frequency characteristics, or the like of the vibration units 52 included in the tactile signal reproducer 32.

Next, the CPU 71 of the presentation control apparatus 31 acquires state information in step S202. The state information contains not only posture information regarding the user, but also information indicating an orientation of the body, information indicating whether or not the user leans his or her back against a backrest, or the like.

Then, the CPU 71 of the presentation control apparatus 31 acquires visual recognition information in step S203. The visual recognition information is information indicating whether or not the user is visually recognizing the screen 24.

Finally, the CPU 71 of the presentation control apparatus 31 acquires distance information in step S204. For example, the distance information is information indicating a distance between the user and the screen 24.

After the completion of the information acquisition process, the CPU 71 of the presentation control apparatus 31 determines in step S102 in FIG. 22 whether or not the tactile signal reproducer 32 currently used by the user is identical to the reference device.

In a case where the tactile signal reproducer 32 is determined to be identical to the reference device, the CPU 71 of the presentation control apparatus 31 proceeds to step S104 without performing processing in step S103.

On the other hand, in a case where the tactile signal reproducer 32 is determined to be different from the reference device, the CPU 71 of the presentation control apparatus 31 executes an adjustment process according to the device information in step S103. For example, in a case where the reference device includes two vibration units 52 and where the user wears the tactile signal reproducer 32 including only one vibration unit 52, two reference tactile signals are combined together to generate adjusted tactile signals with increased signal intensity.

In step S104, the CPU 71 of the presentation control apparatus 31 determines whether or not the adjustment process based on the state information is permitted.

Figure 23:
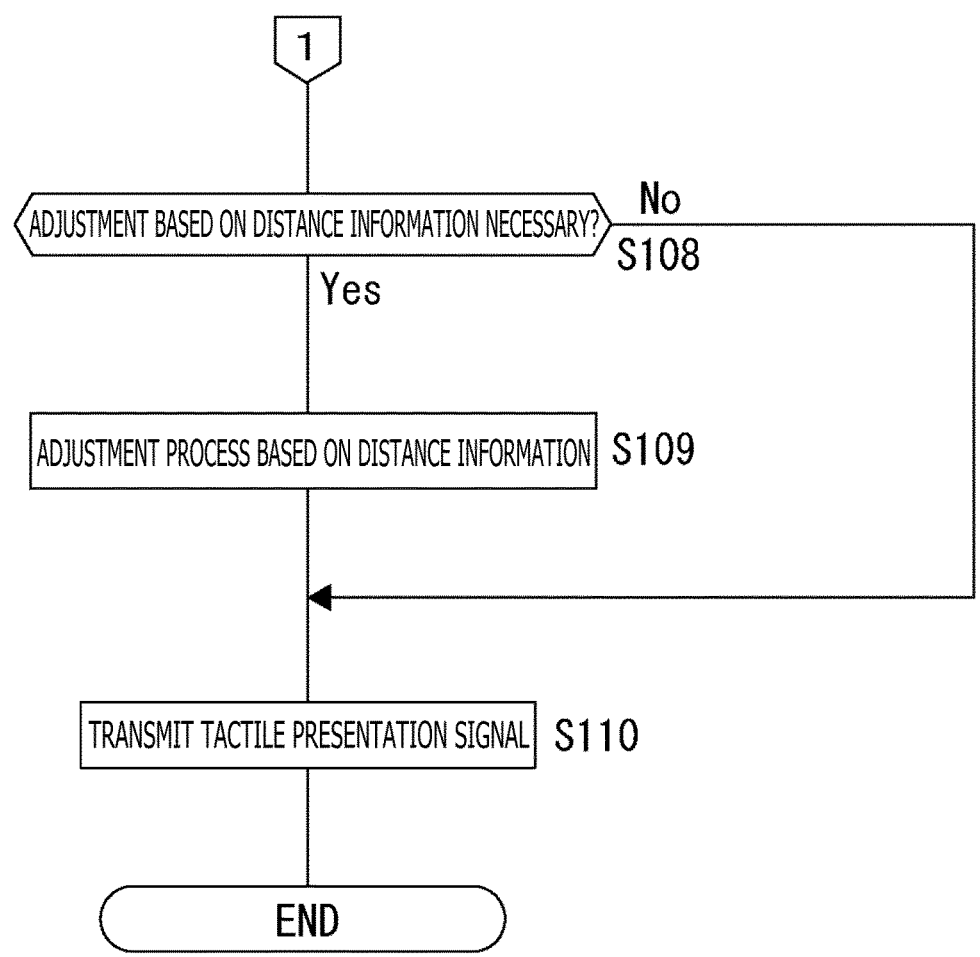
FIG. 23 is a flowchart illustrating the example of the process executed by the presentation control apparatus.

For example, in a case where the creator of the reference tactile signals does not permit the adjustment process or where the user wearing the tactile signal reproducer 32 does not permit the adjustment process, the CPU 71 of the presentation control apparatus 31 proceeds to step S108 in FIG. 23 without executing processing in steps S105, S106, and S107.

On the other hand, in a case where both the creator of the reference tactile signals and the user wearing the tactile signal reproducer 32 permit the adjustment process, the CPU 71 of the presentation control apparatus 31 determines in step S105 whether or not the state of the user is identical to the reference state.

If the state of the user is identical to the reference state, the process proceeds to step S108.

On the other hand, in a case where the state of the user is different from the reference state, the CPU 71 of the presentation control apparatus 31 performs the adjustment process according to the state information in step S106, and performs a notification process for notifying the user of the fact that adjustment has been made, in step S107.

Note that, even when the state of the user is different from the reference state, if the difference between the two states is small, for example, it can be determined that the adjustment process is unnecessary. In such a case, the process may proceed to step S108 without executing processing in steps S106 and S107.

In step S108 in FIG. 23, the CPU 71 of the presentation control apparatus 31 determines whether or not the adjustment process based on the distance information is necessary. For example, in a case where reference tactile signals have been created on an assumption that a tactile stimulus would be given to a user who is located ten meters away from the screen 24, and where a current user wearing the tactile signal reproducer 32 is located two meters away from the screen 24, it is determined that adjustment based on the distance information is necessary.

In this case, the CPU 71 of the presentation control apparatus 31 executes the adjustment process according to the distance information in step S109. For example, in the foregoing example, adjusted tactile signals can be generated by increasing the signal intensity of the reference tactile signals, thereby causing no sense of incongruity for the user located near the screen 24. Moreover, depending on the cases, adjustment may be made to advance a presentation timing of a tactile stimulus in consideration of a propagation time of a shock or the like in order to reduce the sense of incongruity of the tactile stimulus to the minimum.

On the other hand, in a case where the adjustment process based on the distance information is determined to be unnecessary, the CPU 71 of the presentation control apparatus 31 proceeds to step S110 without performing processing in step S109.

In step S110, the CPU 71 of the presentation control apparatus 31 transmits tactile presentation signals. In such a manner, the reference tactile signals or the adjusted tactile signals are transmitted from the presentation control apparatus 31 to the tactile signal reproducer 32.

Figure 25:
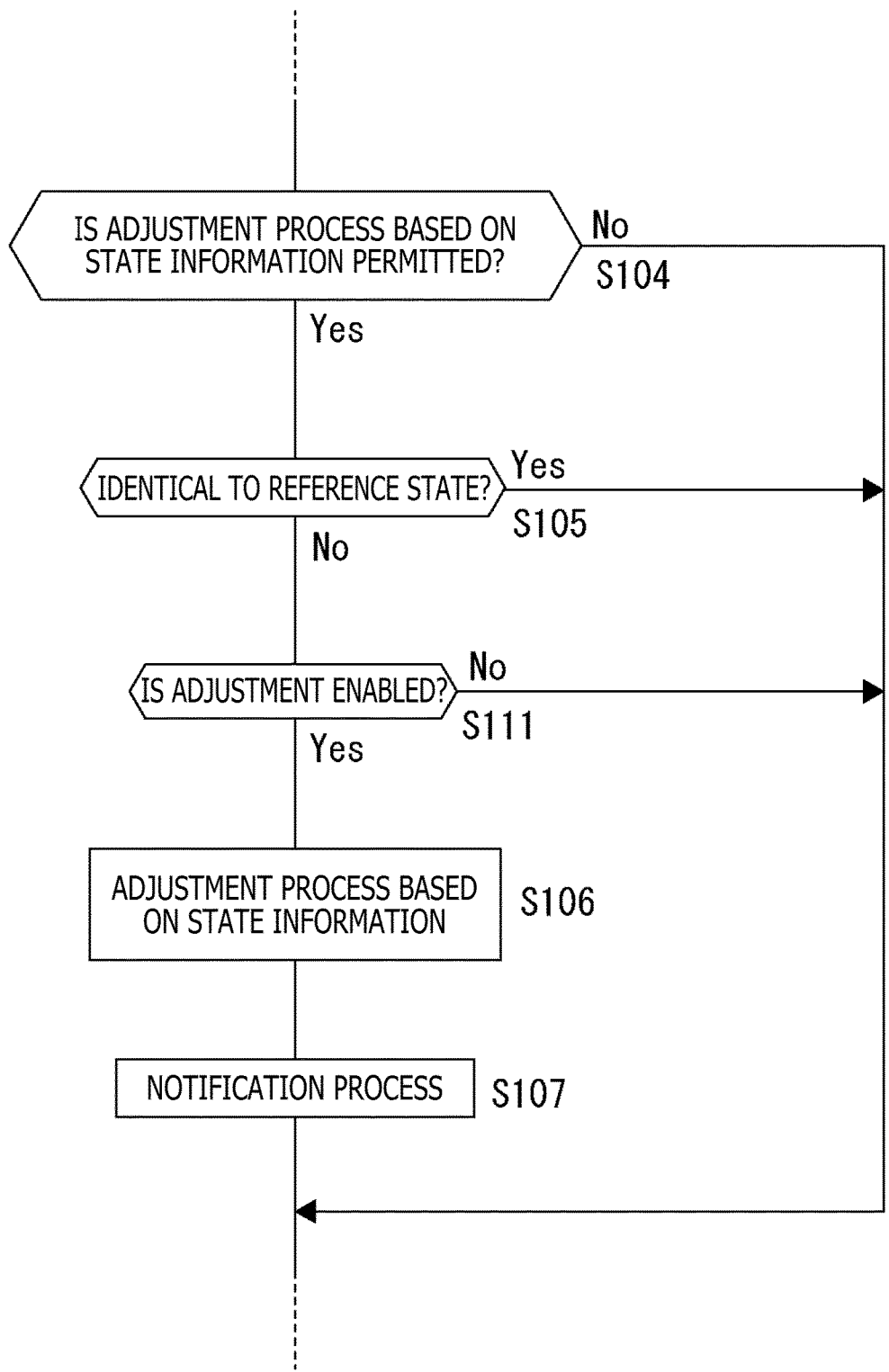
FIG. 25 is a flowchart illustrating a modification of the process executed by the presentation control apparatus.

Note that modifications of the foregoing processes are adoptable. FIG. 25 illustrates an example. Note that processing similar to that in FIG. 22 is given the same reference sign, and description thereof is omitted where appropriate.

In a case of determination in step S104 that the adjustment process is permitted, the CPU 71 of the presentation control apparatus 31 determines in step S105 whether or not the reference state and the state of the user are identical to each other. Thereafter, in a case of determination that the state of the user is different from the reference state, the CPU 71 of the presentation control apparatus 31 determines in step S111 whether or not the adjustment of the reference tactile signals is enabled.

For example, in a case where the posture of the user excessively deviates from the reference posture, it is difficult to perform an appropriate adjustment process. Therefore, the adjustment is determined to be disabled. In a case where the adjustment is determined to be disabled as described above, the CPU 71 of the presentation control apparatus 31 proceeds to processing in step S108 without performing processing in steps S106 and 107. Note that, in this case, the tactile signals may be prevented from being transmitted from the presentation control apparatus 31 to the tactile signal reproducer 32. Alternatively, the tactile signals may be transmitted from the presentation control apparatus 31 to the tactile signal reproducer 32 together with control information indicating that the tactile signals should not be reproduced, thereby preventing the tactile signals from being reproduced by the tactile signal reproducer 32.

On the other hand, in a case where the adjustment is determined to be enabled, the CPU 71 of the presentation control apparatus 31 executes the adjustment process according to the state information in step S106, and performs the notification process in step S107.

<6. Modifications>

According to the example described above, the presentation control apparatus 31 performs the adjustment process for reference tactile signals to generate adjusted tactile signals. However, the adjustment process may also be performed by the tactile signal reproducer 32.

Figure 26:
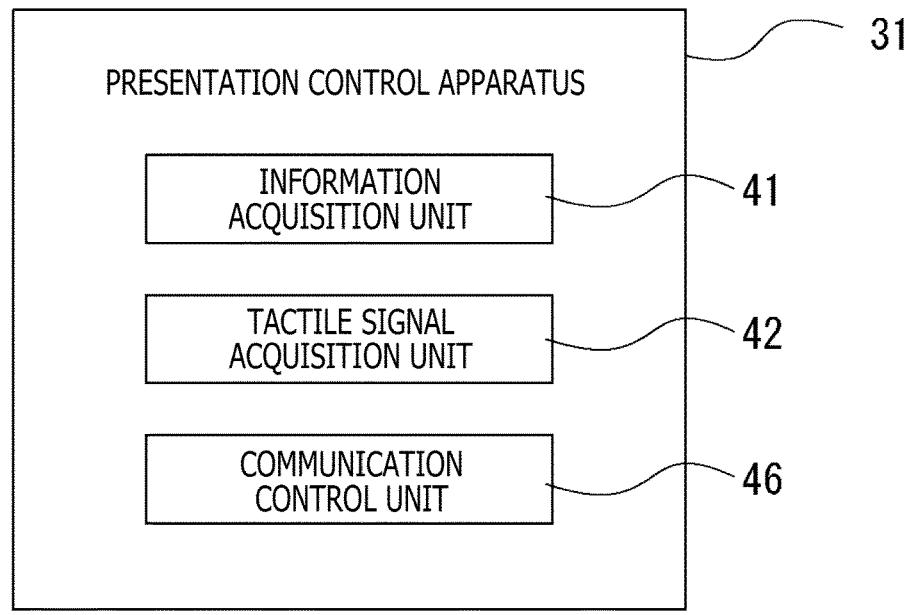
FIG. 26 is a block diagram depicting another example of the functional configuration of the presentation control apparatus.
Figure 27:
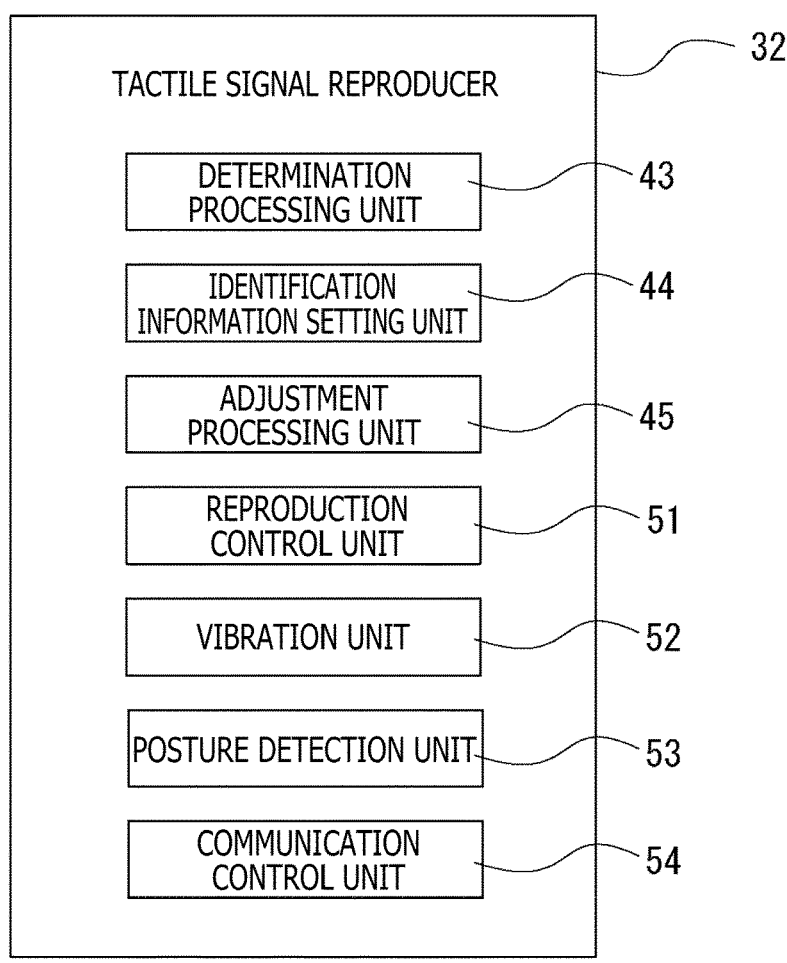
FIG. 27 is a block diagram depicting another example of the functional configuration of the tactile signal reproducer.

FIGS. 26 and 27 depict a configuration of the presentation control apparatus 31 and a configuration of the tactile signal reproducer 32 in a modification, respectively.

As depicted in FIG. 26, the presentation control apparatus 31 includes the information acquisition unit 41, the tactile signal acquisition unit 42, and the communication control unit 46.

In addition, as depicted in FIG. 27, the tactile signal reproducer 32 includes the determination processing unit 43, the identification information setting unit 44, the adjustment processing unit 45, the reproduction control unit 51, the vibration unit 52, the posture detection unit 53, and the communication control unit 54.

The presentation control apparatus 31 transmits reference tactile signals to the tactile signal reproducer 32.

The tactile signal reproducer 32 acquires posture information regarding the posture of the user detected by the posture detection unit 53, information detected by a pressure-sensitive element or the like included in the vibration unit 52, and other information. Moreover, the tactile signal reproducer 32 determines whether or not to perform the adjustment process, on the basis of various types of acquired information. In a case where the adjustment process is to be performed, the adjustment processing unit 45 carries out the adjustment process for the reference tactile signals acquired from the presentation control apparatus 31, to generate adjusted tactile signals. Thereafter, the reproduction control unit 51 outputs the reference tactile signals or the adjusted tactile signals to the vibration unit 52 to achieve presentation of a tactile stimulus.

A processing load imposed on the presentation control apparatus 31 increases in a case where there are a large number of the tactile signal reproducers 32 to which the tactile signals are to be transmitted. According to the present modification, each of the tactile signal reproducers 32 determines whether or not the adjustment process is enabled for the tactile signals, and executes the adjustment process. Accordingly, concentration of a processing load on the presentation control apparatus 31 can be avoided.

The technology described above is applicable to a game system or the like.

For example, in a game system including a game machine, a display device, and a game controller, when the game machine is replaced with the presentation control apparatus 31 described above and the game controller is replaced with the tactile signal reproducer 32 described above, a user can enjoy game content that is more realistic.

Moreover, such a game system is capable of presenting a tactile stimulus according to an operation style of a user by performing a process for determining whether or not the user is holding the game controller tight. Specifically, a small tactile stimulus is given to a user who holds the game controller tight while playing a game. On the other hand, a great tactile stimulus is given to a user who grips the game controller lightly while playing a game. In such a manner, a similar level of tactile stimuli can be provided for users regardless of their play style.

Figure 28:
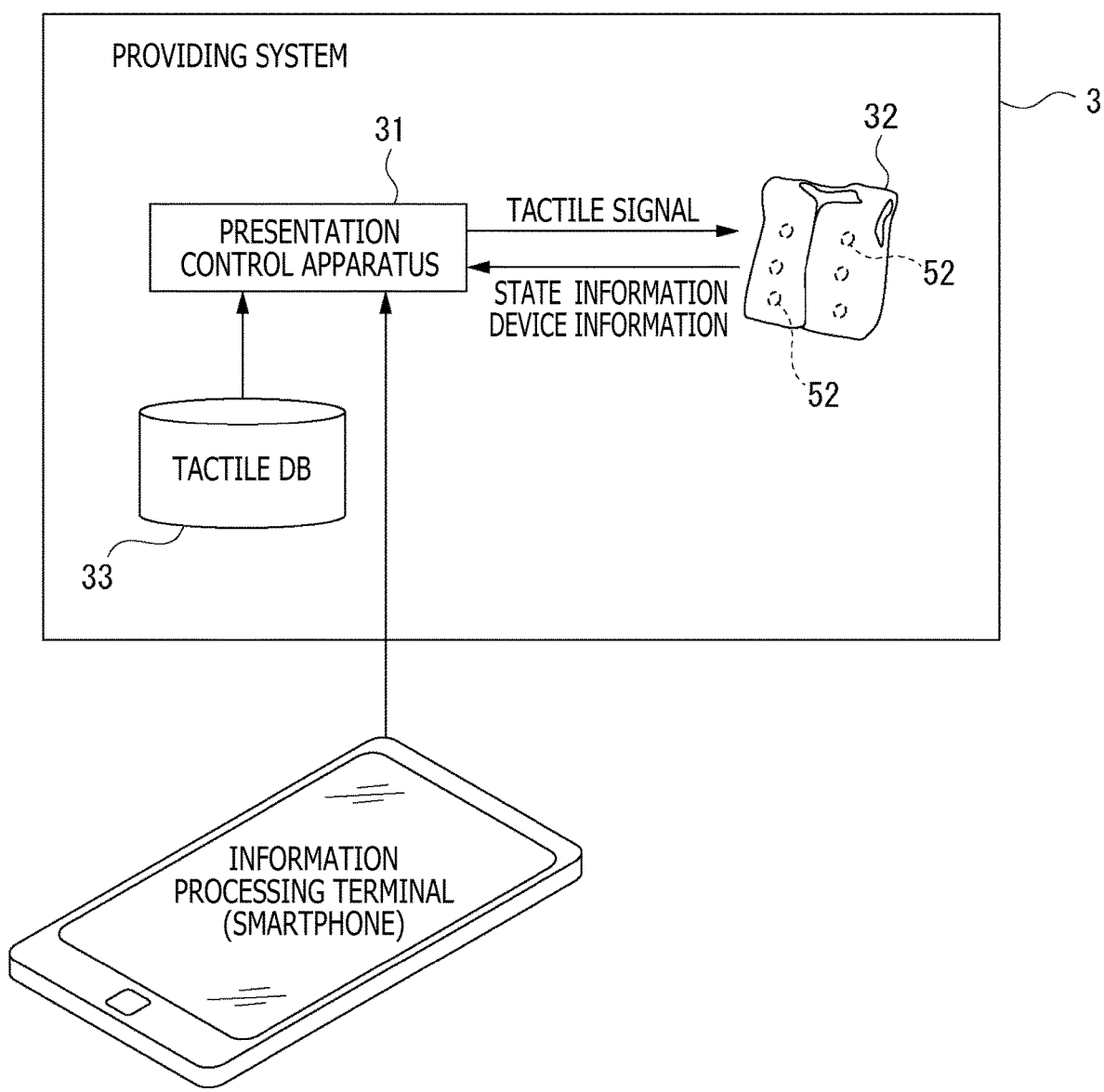
FIG. 28 is a diagram depicting another configuration example of a providing system.

The state information containing the posture information regarding the user may be acquired from the tactile signal reproducer 32, or may be acquired from an information processing terminal (e.g., smartphone) carried by the user (see FIG. 28). For example, the posture of user's smartphone may be stored when the user is in the reference posture, and the amount of change of the posture relative to the stored posture may be received from the smartphone, thereby acquiring the state information regarding the user.

Alternatively, an imaging apparatus for capturing an image of the user may be disposed, and an image analysis process may be performed for the image captured by the imaging apparatus. On the basis of the information obtained from the image analysis process, the posture or the like of the user may then be estimated to acquire the state information.

Further, in a case where the user is wearing multiple tactile signal reproducers 32, the state information may be acquired by estimating posture information regarding the user according to a positional relation between the tactile signal reproducers 32 or a positional relation between the vibration units 52. For example, a distance between the tactile signal reproducer 32 worn on a knee portion of the user and the tactile signal reproducer 32 worn on a chest portion of the user differs between the user standing upright and the user sitting down. By analyzing the difference in distance, whether the user is standing upright or sitting down may be determined.

In the example described above, the vibration unit 52 is provided as a tactile presentation unit of the tactile signal reproducer 32. However, other types of tactile presentation units are also available. Examples of such a tactile presentation unit include a blower for providing the user with a stimulus from an air blast, a device for providing the user with a stimulus from water, moisture, or the like, and an electrode device for providing the user with a stimulus from electricity.

Various types of devices and equipment included in the tactile signal reproducer 32 as described above are capable of providing different tactile stimuli according to the state information regarding the user or the like. Specifically, the blower is capable of presenting an appropriate tactile stimulus according to the posture or the like of the user by changing a blower type to be operated or adjusting a blowing volume and blowing timing. Moreover, the device for providing water or the like (e.g., a device provided on the tactile signal reproducer 32 in the shape of a chair) is capable of providing an appropriate tactile stimulus for the user by adjusting a discharging direction, a discharging volume, a discharging timing, or the like of water (moisture) according to the posture or the like of the user. Further, the electrode device is capable of providing an appropriate tactile stimulus according to the posture or the like of the user by adjusting a place to which an electric stimulus is to be applied, an amount of electricity, an electric stimulus generation pattern, or the like.

<7. Summary>

As described above, the presentation control apparatus 31 as a signal processing apparatus of the present technology includes the information acquisition unit 41 that acquires state information indicating the state of a user including the posture of the user, the tactile signal acquisition unit 42 that acquires a reference tactile signal for performing tactile presentation to the user in a reference state, and the adjustment processing unit 45 that generates an adjusted tactile signal by adjusting the reference tactile signal on the basis of the state information.

When the posture of the user changes, a tactile stimulus that the user feels also changes. According to the present configuration, the adjusted tactile signal corresponding to the state of the user is generated by adjusting the reference tactile signal on the basis of the state information indicating the state of the user including the posture of the user.

In such a manner, tactile presentation can be performed for the user on the basis of an appropriate tactile signal. Accordingly, a sense of realism and immersion can further be increased, and therefore, the user experience can be improved.

For example, the presentation control apparatus 31 as such a signal processing apparatus thus configured is suited for the tactile signal reproducer 32 or the like worn on an arm or the like of the user. The position, direction, and the like of the arm of the user are highly likely to differ among the users. Hence, there are usually only a very few situations where appropriate tactile presentation can be performed according to the direction and position of the arm of the user. However, by applying the configuration described above to such a tactile signal reproducer 32, intended tactile presentation can appropriately be performed for the arm of the user even when the user puts his or her arm at any position. Accordingly, a sense of realism and immersion can be improved.

As described with reference to FIG. 2 and other figures, the determination processing unit 43 that determines whether or not execution of the adjustment is enabled may be provided.

There are a case where a tactile stimulus appropriate for the user changes depending on the posture or the like of the user and a case where a tactile stimulus appropriate for the user does not change regardless of the posture or the like of the user. According to the present configuration, it is possible to switch between a case of executing the adjustment on the basis of the state information regarding the user and a case of not executing the adjustment, as necessary.

Accordingly, it becomes possible to execute the adjustment only for the tactile signal that should be adjusted according to the posture, for example.

As described with reference to FIG. 3 and other figures, the determination processing unit 43 may decide a result of the determination of whether or not the execution of the adjustment is enabled, on the basis of an operation performed by the user.

It is conceivable that whether or not to adjust the tactile signal may automatically be decided according to the type or the like of the tactile signal or otherwise be decided by the user.

According to the present configuration, the user himself or herself can decide whether or not to adjust the tactile signal. Accordingly, preferences of the user can be reflected in the tactile presentation.

As described with reference to each of FIGS. 2 to 9, the determination processing unit 43 may determine whether or not the adjustment is necessary, on the basis of a difference between the posture of the user and the reference state.

This make it possible to appropriately determine whether or not the reference tactile signal needs to be adjusted, in consideration of the posture of the user.

Accordingly, an appropriate tactile stimulus can be given according to the posture of the user. Moreover, there is a case where the adjustment is determined to be unnecessary even when the posture of the user is slightly different from the reference state. In such a case, the adjustment process is prevented from being executed, and therefore, a processing load on the presentation control apparatus 31 can be reduced.

As described with reference to FIG. 25 and other figures, the communication control unit 46 that performs transmission control to transmit a tactile signal to the tactile signal reproducer 32 (32A, 32B, 32C, 32D, or 32E) configured to reproduce the tactile signal may be provided. The communication control unit 46 may perform the transmission control such that the tactile signal is not reproduced by the tactile signal reproducer 32 in a case where the adjustment is determined to be disabled.

A tactile stimulus can be prevented from being given to the user, by preventing the tactile signal from being reproduced in a case where the adjustment is determined to be disabled.

Accordingly, it is possible to eliminate a possibility of reproducing such an inappropriate tactile stimulus that reduces a sense of realism and immersion.

As described with reference FIG. 25 and other figures, the communication control unit 46 may be caused not to transmit the tactile signal in a case where the adjustment is determined to be disabled.

This makes it possible to reduce a processing load upon the transmission process for transmitting the tactile signal.

Accordingly, in a case where the tactile signal is transmitted to each of the tactile signal reproducers 32 (32A, 32B, 32C, 32D, and 32E) used by multiple users, for example, it is possible to avoid such a case where the transmission process cannot be performed at appropriate timing due to the overflow of tasks of the process. Moreover, processing loads upon the reception process and the reproduction process performed by the tactile signal reproducer 32 on the reception side can also be reduced.

As described with reference to FIG. 25 and other figures, the communication control unit 46 may transmit the tactile signal with control information added to the tactile signal so as to prevent the tactile signal from being reproduced in a case where the adjustment is determined to be disabled.

With this, the presentation control apparatus 31 as a signal processing apparatus for adjusting the tactile signal can perform the transmission process to transmit the tactile signal in a uniform manner regardless of necessity or unnecessity of the adjustment. For example, in a case of transmission of the tactile signals to multiple tactile signal reproducers, there is no need to perform control in such a manner as to avoid transmission of the tactile signal to a specific tactile signal worn by a user whose posture is considerably different from the reference state.

In addition, whether or not to execute reproduction of the tactile signal is determined by the tactile signal reproducer 32 having received the tactile signal. Accordingly, a processing load imposed on the signal processing apparatus can be reduced.

As described in the second example of the adjustment process or other examples, the communication control unit 46 that performs transmission control to transmit a tactile signal to the tactile signal reproducer 32 (32A, 32B, 32C, 32D, or 32E) configured to reproduce the tactile signal may be provided. The information acquisition unit 41 may acquire visual recognition information indicating whether or not the user is visually recognizing a video that is to be visually recognized by the user. The communication control unit 46 may perform the transmission control such that the tactile signal is not reproduced by the tactile signal reproducer 32 in a case where information indicating that the user is not visually recognizing the video is acquired as the visual recognition information.

It is assumed that the user feels tactile stimuli in various situations. As such situations, there are a case where the user is not concentrating on content and a case where the user is not concentrating on the content. For example, supposing that the user enjoys watching a video with a tactile stimulus, as a method for determining whether or not the user is concentrating on the content, it is considered to determine whether or not the user is properly viewing and listening to the video.

It is conceivable that the user not concentrating on the screen enjoys the content while doing a different thing. According to the present configuration, presentation of the tactile stimulus to such a user can be suspended or stopped so as not to interrupt the different action that the user is doing while viewing and listening to the content. Specifically, for example, if a user is viewing content while writing characters, the user does not view the screen at many moments during display of the content. If a tactile stimulus is provided for such a user, the provided tactile stimulus may possibly interrupt the action that the user is doing, and the user may hence be unable to write accurate characters, for example. However, by appropriately determining the user in such a situation and suspending or stopping the presentation of the tactile stimulus according to the determination, it becomes possible to prevent the tactile stimulus from disturbing the user who is doing multiple things at the same time.

As described with reference to FIG. 23 and other figures, the communication control unit 46 that performs transmission control to transmit a tactile signal to the tactile signal reproducer 32 (32A, 32B, 32C, 32D, or 32E) configured to reproduce the tactile signal may be provided. The communication control unit 46 may perform the transmission control to give a notification that the adjustment has been made, in a case where the adjusted tactile signal is transmitted.

In such a manner, the user can recognize that the reference tactile signal has been adjusted.

Accordingly, the user can recognize that the meaning of a tactile stimulus need not be redefined in consideration of the posture and the physical position of the user. Specifically, when the user genuinely feels a tactile stimulus, the user can recognize that the user receives the tactile stimulus as intended by the creator. Accordingly, the user can feel a sense of realism and immersion.

As described in the third example of the adjustment process and other examples, when adjusting the reference tactile signal, the adjustment processing unit 45 may make adjustment to change strength of the tactile presentation.

This makes it possible to perform the tactile presentation with appropriate strength according to the state of the user.

As described in the third example of the adjustment process and other examples, the adjustment processing unit 45 may make the adjustment according to the tactile signal reproducer 32 (32A, 32B, 32C, 32D, or 32E) worn by the user.

This makes it possible to transmit the tactile signal which is appropriately adjusted according to not only the difference in the state of the user but also the difference in the tactile signal reproducer 32 worn by the user.

Accordingly, the user can have an optimum user experience only by feeling a tactile stimulus provided by the tactile signal reproducer 32 without knowing the difference in his or her own posture, the difference in the tactile signal reproducer 32 worn by the user, or the like.

As described in the third example of the adjustment process and other examples, the adjustment processing unit 45 may adjust the strength and a timing of the tactile presentation according to the state information and the position of the tactile presentation unit (vibration unit 52, 52C, 52R, or 52L) included in the tactile signal reproducer 32 (32A, 32B, 32C, 32D, or 32E).

In such a manner, even when users wear the tactile signal reproducers 32 which include the vibration units 52 at different positions, an appropriate tactile signal is generated for each of the users.

Accordingly, the user can enjoy the tactile stimulus without knowing not only the difference in his or her own posture but also the difference in the position of the vibration unit 52.

Moreover, strength of vibrations felt by the user may be different depending on the position of the vibration unit 52. According to the present configuration, adjustment can be made in consideration of a difference in strength of vibrations felt by the user according to the position of the vibration unit 52. Hence, a tactile stimulus reflecting the intention of the creator more accurately can be provided for the user. Accordingly, the user can have a more realistic and immersive experience.

As described in the fourth example of the adjustment process and other examples, the information acquisition unit 41 may acquire distance information indicating a distance between the user and a display device (screen 24) on which a video to be visually recognized by the user is displayed, and the adjustment processing unit 45 may make adjustment to change the strength of the tactile presentation according to the acquired distance information.

In a case where the user enjoys a tactile stimulus while viewing a video, an optimum tactile stimulus is highly likely to change when the video is viewed in a different manner.

According to the present configuration, it is possible to increase the strength of the tactile presentation as the user is located closer to the display device, for example. Accordingly, the user can feel a much more sense of realism and immersion.

As described with reference to FIG. 2 and other figures, the information acquisition unit 41 may acquire the state information every time the posture of the user changes.

When the posture of the user changes, an optimum tactile stimulus also changes.

By acquiring the latest state information regarding the user according to the change of the posture, an optimum tactile stimulus can continuously be provided for the user even when the user is intermittently moving.

Note that the advantageous effects described in the present description are merely examples, and advantageous effects to be offered are not limited to them. In addition, other advantageous effects may be produced.

Moreover, any combinations of the respective examples described above can be applied as long as they are feasible.

<8. Present Technology>

The present technology may also have the following configurations.

(1)
A signal processing apparatus including:
an information acquisition unit that acquires state information indicating a state of a user including a posture of the user;
a tactile signal acquisition unit that acquires a reference tactile signal for performing tactile presentation to the user in a reference state; and
an adjustment processing unit that generates an adjusted tactile signal by adjusting the reference tactile signal on the basis of the state information.

(2)
The signal processing apparatus according to (1) described above, further including:
a determination processing unit that determines whether or not execution of the adjustment is enabled.

(3)
The signal processing apparatus according to (2) described above, in which the determination processing unit decides a result of the determination of whether or not the execution of the adjustment is enabled, on the basis of an operation performed by the user.

(4)
The signal processing apparatus according to either (2) or (3) described above, in which the determination processing unit determines whether or not the adjustment is necessary, on the basis of a difference between the posture of the user and the reference state.

(5)
The signal processing apparatus according to (4) described above, further including:
a communication control unit that performs transmission control to transmit a tactile signal to a tactile signal reproducer configured to reproduce the tactile signal, in which
the communication control unit performs the transmission control such that the tactile signal is not reproduced by the tactile signal reproducer in a case where the adjustment is determined to be disabled.

(6)
The signal processing apparatus according to (5) described above, in which the communication control unit does not transmit the tactile signal in the case where the adjustment is determined to be disabled.

(7)
The signal processing apparatus according to (5) described above, in which the communication control unit transmits the tactile signal with control information added to the tactile signal so as to prevent the tactile signal from being reproduced in the case where the adjustment is determined to be disabled.

(8)
The signal processing apparatus according to any one of (1) to (7) described above, further including:
the communication control unit that performs transmission control to transmit a tactile signal to a tactile signal reproducer configured to reproduce the tactile signal, in which
the information acquisition unit acquires visual recognition information indicating whether or not the user is visually recognizing a video that is to be visually recognized by the user, and
the communication control unit performs the transmission control such that the tactile signal is not reproduced by the tactile signal reproducer in a case where information indicating that the user is not visually recognizing the video is acquired as the visual recognition information.

(9)
The signal processing apparatus according to any one of (1) to (8) described above, further including:
the communication control unit that performs transmission control to transmit a tactile signal to a tactile signal reproducer configured to reproduce the tactile signal, in which
the communication control unit performs the transmission control to give a notification that the adjustment has been made, in a case where the adjusted tactile signal is transmitted.

(10)
The signal processing apparatus according to any one of (1) to (9) described above, in which, when adjusting the reference tactile signal, the adjustment processing unit makes adjustment to change strength of the tactile presentation.

(11)
The signal processing apparatus according to (10) described above, in which the adjustment processing unit makes the adjustment according to a tactile signal reproducer worn by the user.

(12)
The signal processing apparatus according to (11) described above, in which the adjustment processing unit adjusts the strength and a timing of the tactile presentation according to the state information and a position of a tactile presentation unit included in the tactile signal reproducer.

(13)
The signal processing apparatus according to any one of (10) to (12) described above, in which
the information acquisition unit acquires distance information indicating a distance between the user and a display device on which a video to be visually recognized by the user is displayed, and
the adjustment processing unit makes the adjustment to change the strength of the tactile presentation according to the acquired distance information.

(14)

The signal processing apparatus according to any one of (1) to (13) described above, in which the information acquisition unit acquires the state information every time the posture of the user changes.

(15)

A signal processing method performed by a signal processing apparatus, the signal processing method including:

a process of acquiring state information indicating a state of a user including a posture of the user;

a process of acquiring a reference tactile signal for performing tactile presentation to the user in a reference state; and a process of generating an adjusted tactile signal by adjusting the reference tactile signal on the basis of the state information.

(16)

A signal processing system including:

a signal processing apparatus that includes an information acquisition unit that acquires state information indicating a state of a user including a posture of the user, a tactile signal acquisition unit that acquires a reference tactile signal for performing tactile presentation to the user in a reference state, and an adjustment processing unit that generates an adjusted tactile signal by adjusting the reference tactile signal on the basis of the state information; and a tactile signal reproducer that reproduces the adjusted tactile signal.

REFERENCE SIGNS LIST

3: Providing system (signal processing system)
24: Screen (display device)
31: Presentation control apparatus (signal processing apparatus)
32, 32A, 32B, 32C, 32D, 32E: Tactile signal reproducer
41: Information acquisition unit
42: Tactile signal acquisition unit
43: Determination processing unit
44: Identification information setting unit
45: Adjustment processing unit
46: Communication control unit
52, 52C, 52R, 52L: Vibration unit (tactile presentation unit)

The invention claimed is:

1. A signal processing apparatus, comprising:
an information acquisition unit configured to acquire state information that indicates a state of a user, wherein the state of the user includes a posture of the user;
a tactile signal acquisition unit configured to acquire a reference tactile signal to perform tactile presentation to the user in a reference state, wherein the reference state of the user includes a reference posture of the user;
a determination processing unit configured to determine that a difference, between the posture of the user and the reference posture of the user, exceeds a threshold; and
an adjustment processing unit configured to disable an adjustment of the reference tactile signal based on the determination that the difference exceeds the threshold.

2. The signal processing apparatus according to claim 1, wherein
the determination processing unit is further configured to determine enablement for execution of the adjustment of the reference tactile signal, and
the adjustment processing unit is further configured to:
adjust the reference tactile signal based on the state information and the determined enablement for the execution of the adjustment; and
generate an adjusted tactile signal based on the adjustment of the reference tactile signal.

3. The signal processing apparatus according to claim 2, wherein the determination processing unit is further configured to determine, based on a user operation, a result of the enablement for the execution of the adjustment.

4. The signal processing apparatus according to claim 2, further comprising:
a communication control unit configured to transmit the reference tactile signal to a tactile signal reproducer, wherein
the tactile signal reproducer reproduces the reference tactile signal, and
the transmission of the reference tactile signal is based on the execution of the adjustment is enabled.

5. The signal processing apparatus according to claim 4, wherein the communication control unit is further configured to transmit the adjusted tactile signal to the tactile signal reproducer based on the execution of the adjustment is enabled.

6. The signal processing apparatus according to claim 1, further comprising
a communication control unit configured to transmit the reference tactile signal to a tactile signal reproducer, wherein
the reference tactile signal includes control information to prevent a reproduction of the reference tactile signal via the tactile signal reproducer.

7. The signal processing apparatus according to claim 5, wherein
the information acquisition unit is further configured to acquire a visual recognition information that indicates a visual recognition of a video by the user, and
the communication control unit is further configured to transmit the adjusted tactile signal based on the visual recognition information.

8. The signal processing apparatus according to claim 2, further comprising:
a communication control unit configured to transmit the adjusted tactile signal to a tactile signal reproducer, wherein the tactile signal reproducer reproduces the adjusted tactile signal; and
transmit a notification of the adjustment.

9. The signal processing apparatus according to claim 2, wherein the adjustment processing unit is further configured to adjust the reference tactile signal to change a strength of the tactile presentation.

10. The signal processing apparatus according to claim 9, wherein the adjustment processing unit is further configured to adjust the reference tactile signal based on a tactile signal reproducer worn by the user.

11. The signal processing apparatus according to claim 10, wherein the adjustment processing unit is further configured to adjust the strength and a timing of the tactile presentation based on the state information and a position of a tactile presentation unit included in the tactile signal reproducer.

12. The signal processing apparatus according to claim 9, wherein
the information acquisition unit is further configured to acquire distance information that indicates a distance between the user and a display device on which a video to be visually recognized by the user is displayed, and
the adjustment processing unit is further configured to adjust, based on the acquired distance information, the reference tactile signal to change the strength of the tactile presentation.

13. The signal processing apparatus according to claim 1, wherein the information acquisition unit is further configured to acquire the state information based on a change in the posture of the user.

14. A signal processing method, comprising:
in a signal processing apparatus:
  acquiring state information that indicates a state of a user, wherein the state of the user includes a posture of the user;
  acquiring a reference tactile signal to perform tactile presentation to the user in a reference state, wherein the reference state of the user includes a reference posture of the user;
  determining that a difference, between the posture of the user and the reference posture of the user, exceeds a threshold; and
  disabling an adjustment of the reference tactile signal based on the determination that the difference exceeds the threshold.

15. A signal processing system, comprising:
a signal processing apparatus that includes:
  an information acquisition unit configured to acquire state information that indicates a state of a user, wherein the state of the user includes a posture of the user;
  a tactile signal acquisition unit configured to acquire a reference tactile signal to perform tactile presentation to the user in a reference state, wherein the reference state of the user includes a reference posture of the user;
  a determination processing unit configured to determine that a difference, between the posture of the user and the reference posture of the user, exceeds a threshold;
  an adjustment processing unit configured to disable an adjustment of the reference tactile signal based on the determination that the difference exceeds the threshold; and
  a communication control unit configured to transmit the reference tactile signal; and
a tactile signal reproducer configured to receive the reference tactile signal,
  wherein the reference tactile signal includes control information to prevent reproduction of the reference tactile signal via the tactile signal reproducer.

* * * * *